US009973787B2

United States Patent
Nakajima

(10) Patent No.: US 9,973,787 B2
(45) Date of Patent: May 15, 2018

(54) COMMUNICATION DEVICE AND COMMUNICATION METHOD

(71) Applicant: SONY CORPORATION, Tokyo (JP)

(72) Inventor: Yasuhisa Nakajima, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days. days.

(21) Appl. No.: 15/306,288

(22) PCT Filed: Feb. 13, 2015

(86) PCT No.: PCT/JP2015/054039
§ 371 (c)(1),
(2) Date: Oct. 24, 2016

(87) PCT Pub. No.: WO2015/166685
PCT Pub. Date: Nov. 5, 2015

(65) Prior Publication Data
US 2017/0055005 A1 Feb. 23, 2017

(30) Foreign Application Priority Data
May 1, 2014 (JP) .................................. 2014-094752

(51) Int. Cl.
| | |
|---|---|
| *H04N 7/173* | (2011.01) |
| *H04N 21/234* | (2011.01) |
| *H04N 21/436* | (2011.01) |
| *H04N 21/233* | (2011.01) |
| *H04N 21/4363* | (2011.01) |
| *H04N 21/643* | (2011.01) |

(52) U.S. Cl.
CPC ......... *H04N 21/234* (2013.01); *H04N 21/233* (2013.01); *H04N 21/436* (2013.01); *H04N 21/43635* (2013.01); *H04N 21/64322* (2013.01)

(58) Field of Classification Search
CPC .. H04N 21/234; H04N 21/233; H04N 21/436; H04N 21/43635; H04N 21/64322
See application file for complete search history.

(56) References Cited

U.S. PATENT DOCUMENTS

| | | | |
|---|---|---|---|
| 2010/0066906 A1* | 3/2010 | Nakajima | H04N 21/2662 348/500 |
| 2010/0185764 A1* | 7/2010 | Kondo | H04L 12/2807 709/225 |
| 2014/0223461 A1* | 8/2014 | Hatambeiki | H04N 21/44218 725/10 |

FOREIGN PATENT DOCUMENTS

| | | |
|---|---|---|
| JP | 2012-213111 A | 11/2012 |
| JP | 2013-005265 A | 1/2013 |

* cited by examiner

*Primary Examiner* — John Schnurr
(74) *Attorney, Agent, or Firm* — Chip Law Group

(57) ABSTRACT

Content data control is to be performed in a preferred manner between a device such as an HDMI device and an IP (DLNA) device. In response to transmission request information received from a mobile terminal (14) via a wireless transmission path (16), a television receiver (13) transmits information related to uncompressed image/audio data to the mobile terminal (14) via the wireless transmission path (16), the related information having been acquired from an HDMI-connected BD recorder (11). The mobile terminal (14) displays a list of content information in accordance with the received related information, and transmits the control information about selected content to the television receiver (13).

20 Claims, 17 Drawing Sheets

FIG. 8

| Byte# | 7 | 6 | 5 | 4 | 3 | 2 | 1 | 0 |
|---|---|---|---|---|---|---|---|---|
| 0 | Vendor-specific tag code (=3) | | | | Length (=N) | | | |
| 1…3 | 24bit IEEE Registration Identifier (0x000C03) LSB first | | | | | | | |
| 4 | A | | | | B | | | |
| 5 | C | | | | D | | | |
| 6 | Supports-AI | DC_48bit | DC_36bit | DC_30bit | DC_Y444 | Reserved (0) | | DVI_Dual |
| 7 | Max_TMDS_Clock | | | | | | | |
| 8 | Latency_Field_Present | I_Latency_Fields_Present | Reserved (0) | | List_Query_Extension | CNC3 | CNC2 | CNC1 | CNC0 |
| (9) | Video_Latency | | | | | | | |
| (10) | Audio_Latency | | | | | | | |
| (11) | Interlaced_Video_Latency | | | | | | | |
| (12) | Interlaced_Audio_Latency | | | | | | | |
| (13) | Reserved (0) | | | | | | | |
| (14) | CEC | VSIF | HEC | | Reserved (0) | | | |
| (15)…N | Reserved (0) | | | | | | | |

| Byte# | 7 | 6 | 5 | 4 | 3 | 2 | 1 | 0 |
|---|---|---|---|---|---|---|---|---|
| 0 | Checksum ||||||||
| 1···3 | 24 bit IEEE Registration Identifier (0x000C03) LSB first ||||||||
| 4 | Reserved(0) | | | | | | | List_Ext |
| (5) | Reserved(0) ||||||||
| (6) | Number of Content (N) ||||||||
| (7) | Length #1 (=L) ||||||||
| (8)···(9) | Duration #1 (min) ||||||||
| (10)···(10+L-2) | Title #1 ||||||||
| ... | ... ||||||||
| (10+X) | Length #N (=M) ||||||||
| (11+X)···(12+X) | Duration #N (min) ||||||||
| (13+X)···(13+M-2) | Title #N ||||||||

900

| content list { | Descriptor |
|---|---|
| id | u(1) |
| number_content_minus 1 | u(1) |
| for( i=0; i<= number_content_minus 1; i++){ | |
| length[i] | u(1) |
| duration[i] | u(2) |
| CEC_address[i] | u(1) |
| HDMI_terminal_number[i] | u(1) |
| title[i] | u(v) |
| } | |
| } | |

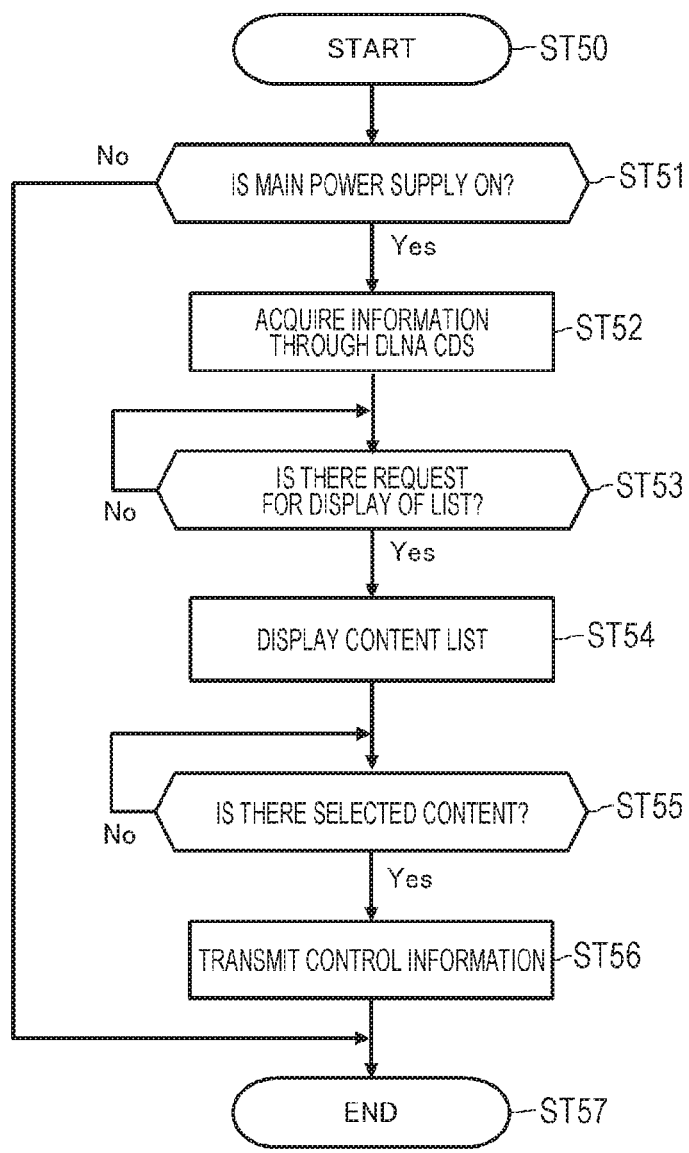

COMMUNICATION DEVICE AND COMMUNICATION METHOD

CROSS REFERENCE TO RELATED APPLICATIONS

This application is a U.S. National Phase of International Patent Application No. PCT/JP2015/054039 filed on Feb. 13, 2015, which claims priority benefit of Japanese Patent Application No. JP 2014-094752 filed in the Japan Patent Office on May 1, 2014. Each of the above-referenced applications is hereby incorporated herein by reference in its entirety.

TECHNICAL FIELD

The technology disclosed in this specification relates to communication devices or communication methods, and computer programs for transmitting and receiving data, or retransmitting received data.

BACKGROUND ART

High Definition Multimedia Interfaces (HDMIs (registered trademark)) have been becoming popular as communication interfaces for high-speed transmission of uncompressed (baseband) image signals (image data) and digital audio signals (audio data) accompanying the image signals. The data transmission end connected via an HDMI interface is an HDMI source device, and the data reception end is an HDMI sink device.

In an example of an AV system or the like, a Blu-ray Disc (BD) recorder, a set top box (STB), and some other audio visual source (AV source) as HDMI source devices may be connected to a television receiver, a projector, and some other display as HDMI sink devices by HDMI interfaces (see Patent Document 1, for example). Further, a control method is defined for content to be provided by an HDMI source device such as a BD recorder, on the assumption that the BD recorder is controlled and selected directly from an HDMI sink device such as a television receiver, and a screen is displayed on the HDMI sink device.

Meanwhile, inter-device control according to digital living network alliance (DLNA) has also been put into practical use as a control scheme with the IP (Internet Protocol). DLNA defines 2-Box Pull System Usage formed with a digital media server (DMS) as a content providing server and a digital media player (DMP) as a client that reproduces data, and 3-Box System Usage having a digital media renderer (DMR) and a digital media controller (DMC) as clients. In the latter 3-Box System, the DMC is operated so that content can be transmitted from the DMS to the DMR and be reproduced. Further, in universal plug and play (UPnP) on which DLNA is based, a content directory service (CDS) function is designed to hierarchize and deliver a list of and information about the content held by a digital media server (DMS), and this can also be applied to DLNA (see Patent Document 2, for example).

In a device configuration in which a DLNA device and an HDMI device coexist, however, HDMI content cannot be controlled from the DLNA device. This is because the specifications of content data control with a digital interface such as an HDMI are valid only between devices connected by an HDMI. Besides, DLNA has also suggested a specification of content data control between IP-connected devices, but such a specification does not support control between devices outside its network.

Particularly, there have been user demands for use cases of 3Box Control with a mobile terminal device serving as a device that controls devices, like a mobile digital media controller (M-DMC) of DLNA. However, HDMI content cannot be controlled in such cases.

CITATION LIST

Patent Documents

Patent Document 1: Japanese Patent Application Laid-Open No. 2013-5265
Patent Document 2: Japanese Patent Application Laid-Open No. 2012-213111

SUMMARY OF THE INVENTION

Problems to be Solved by the Invention

The technology disclosed in this specification aims to provide an excellent communication device or method, and a computer program that are capable of appropriately transmitting information related to uncompressed image/audio data between a device such as an HDMI device and an IP (DLNA) device, the uncompressed image/audio data being transmitted through a digital interface such as an HDMI.

Solutions to Problems

This application has been made in view of the above problems, and the technology disclosed in claim 1 is a communication device that includes:
   a data transmission unit that transmits uncompressed image/audio data to an external device via a predetermined transmission path; and
   an information transmission unit that transmits information related to the uncompressed image/audio data to be transmitted by the data transmission unit, and transmission scheme information to the external device via the transmission path.

According to the technology disclosed in claim 2 of this application, the communication device of claim 1 further includes: an information reception unit that receives transmission scheme information about information related to uncompressed image/audio data with which the external device is compatible, from the external device via the transmission path; and a scheme selection unit that selects a transmission scheme to be used in the information transmission unit, in accordance with the transmission scheme information received by the information reception unit. The information transmission unit then transmits the information related to the uncompressed image/audio data to the external device via the transmission path, in accordance with the scheme selected by the scheme selection unit.

According to the technology disclosed in claim 3 of this application, the information transmission unit of the communication device of claim 1 or 2 transmits the information related to the uncompressed image/audio data and the transmission scheme information to the external device by inserting the related information and the transmission scheme information into a blanking period of the uncompressed image/audio data to be transmitted by the data transmission unit.

According to the technology disclosed in claim 4 of this application, the information transmission unit of the communication device of claim 1 or 2 transmits the information related to the uncompressed image/audio data and the transmission scheme information to the external device via a bidirectional communication path formed with a predetermined line included in the transmission path.

According to the technology disclosed in claim 5 of this application, the information transmission unit of the communication device of claim 1 or 2 transmits the information related to the uncompressed image/audio data and the transmission scheme information to the external device via a control data line included in the transmission path.

According to the technology disclosed in claim 6 of this application, the information transmission unit of the communication device of any of claims 1 through 5 transmits at least one piece of information as the information related to the uncompressed image/audio data, the at least one piece of information being among length information, play duration information, title information about the uncompressed image/audio data, and a thumbnail of content.

Further, the technology disclosed in claim 7 of this application is a communication method that includes:
  a data transmission step of transmitting uncompressed image/audio data to an external device via a predetermined transmission path; and
  an information transmission step of transmitting information related to the uncompressed image/audio data to be transmitted by the data transmission unit, and transmission scheme information to the external device via the transmission path.

Further, the technology disclosed in claim 8 of this application is a computer program written in a computer-readable format to cause a computer to function as:
  a data transmission unit that transmits uncompressed image/audio data to an external device via a predetermined transmission path; and
  an information transmission unit that transmits information related to the uncompressed image/audio data to be transmitted by the data transmission unit, and transmission scheme information to the external device via the transmission path.

The computer program according to claim 8 of this application defines a computer program written in a computer-readable format so as to enable a predetermined process in a computer. In other words, as the computer program according to claim 8 of this application is installed into a computer, cooperative actions are caused in the computer, and similar effects to those of the communication device according to claim 1 of this application can be achieved.

Further, the technology disclosed in claim 9 of this application is a communication device that includes:
  a data reception unit that receives uncompressed image/audio data from an external device via a predetermined transmission path;
  an information reception unit that receives information related to the uncompressed image/audio data to be received by the data reception unit, and transmission scheme information from the external device via the transmission path; and
  a data processing unit that processes the information related to the uncompressed image/audio data received by the information reception unit, in accordance with the transmission scheme information received by the information reception unit.

According to the technology disclosed in claim 10 of this application, the communication device of claim 9 further includes: an information storage unit that stores transmission scheme information about information related to uncompressed image/audio data with which the communication device is compatible; and an information transmission unit that transmits the transmission scheme information stored in the information storage unit to the external device via the transmission path.

According to the technology disclosed in claim 11 of this application, the information reception unit of the communication device of claim 9 or 10 extracts the information related to the uncompressed image/audio data and the transmission scheme information from a blanking period of the uncompressed image/audio data to be received by the data reception unit.

According to the technology disclosed in claim 12 of this application, the information reception unit of the communication device of claim 9 or 10 receives the information related to the uncompressed image/audio data and the transmission scheme information from the external device via a bidirectional communication path formed with a predetermined line included in the transmission path.

According to the technology disclosed in claim 13 of this application, the information reception unit of the communication device of claim 9 or 10 receives the information related to the uncompressed image/audio data and the transmission scheme information from the external device via a control data line included in the transmission path.

According to the technology disclosed in claim 14 of this application, the data processing unit of the communication device of any of claims 9 through 13 generates content information by adding additional information obtained by the communication device to the information related to the uncompressed image/audio data received by the information reception unit. The communication device further includes a second information transmission unit that transmits the content information to a second external device via a second transmission path.

According to the technology disclosed in claim 15 of this application, the data processing unit of the communication device of claim 14 adds at least one piece of information as the additional information, the at least one piece of information being among a sequential number or an extension indicating the uncompressed image/audio data, address information (the CEC address) about the external device, and connection information about the external device (the number allotted to a terminal to which the external device is connected).

According to the technology disclosed in claim 16 of this application, the communication device of claim 14 further includes: a second information reception unit that receives control information about the uncompressed image/audio data from the second external device via the second transmission path; and a connection control unit that controls the connection to the external device, in accordance with the control information received by the second information reception unit. The information transmission unit transmits the control information about the uncompressed image/audio data, via the transmission path, to the external device connected by the connection control unit.

Further, the technology disclosed in claim 17 of this application is a communication device that includes:
  a data reception step of receiving uncompressed image/audio data from an external device via a predetermined transmission path;
  an information reception step of receiving information related to the uncompressed image/audio data to be received in the data reception step, and transmission scheme information from the external device via the transmission path; and
  a data processing step of processing the information related to the uncompressed image/audio data received by the information reception unit, in accordance with the transmission scheme information received in the information reception step.

Further, the technology disclosed in claim 18 of this application is a computer program written in a computer-readable format to cause a computer to function as:

a data reception unit that receives uncompressed image/audio data from an external device via a predetermined transmission path;

an information reception unit that receives information related to the uncompressed image/audio data to be received by the data reception unit, and transmission scheme information from the external device via the transmission path; and a data processing unit that processes the information related to the uncompressed image/audio data received by the information reception unit, in accordance with the transmission scheme information received by the information reception unit.

The computer program according to claim 18 of this application defines a computer program written in a computer-readable format so as to enable a predetermined process in a computer. In other words, as the computer program according to claim 18 of this application is installed into a computer, cooperative actions are caused in the computer, and similar effects to those of the communication device according to claim 9 of this application can be achieved.

Further, the technology disclosed in claim 19 of this application is a communication device that includes:

an information reception unit that receives information related to uncompressed image/audio data from an external device via a second transmission path;

a data processing unit that displays and processes list information about the uncompressed image/audio data, in accordance with the information related to the uncompressed image/audio data received by the information reception unit; and an information transmission unit that transmits information related to uncompressed image/audio data selected from the list information to the external device via the second transmission path.

Further, the technology disclosed in claim 20 of this application is a computer program written in a computer-readable format to cause a computer to function as:

an information reception unit that receives information related to uncompressed image/audio data from an external device via a second transmission path;

a data processing unit that displays and processes list information about the uncompressed image/audio data, in accordance with the information related to the uncompressed image/audio data received by the information reception unit; and an information transmission unit that transmits information related to uncompressed image/audio data selected from the list information to the external device via the second transmission path.

The computer program according to claim. 20 of this application defines a computer program written in a computer-readable format so as to enable a predetermined process in a computer. In other words, as the computer program according to claim 20 of this application is installed into a computer, cooperative actions are caused in the computer, and similar effects to those of the communication device according to claim 19 of this application can be achieved.

Effects of the Invention

According to the technology disclosed in this specification, it is possible to provide an excellent communication device or method, and a computer program that are capable of appropriately transmitting information related to uncompressed image/audio data between a device such as an HDMI device and an IP (DLNA) device, the uncompressed image/audio data being transmitted through a digital interface such as HDMI.

Therefore, according to the technology disclosed in this specification, related information can be obtained by a DLNA device IP-connected to an HDMI sink device, and uncompressed image/audio data can be controlled from the DLNA device in an AV system in which the uncompressed image/audio data provided from an HDMI source device is viewed with the HDMI sink device.

Note that the advantageous effects described in this specification are merely examples, and the advantageous effects of the present invention are not limited to them. Further, the present invention may further exhibit additional advantageous effects, in addition to the above described advantageous effects.

Other objects, features, and advantages of the technology disclosed in this specification will be made apparent by the embodiments described below and the detailed descriptions with reference to the accompanying drawings.

BRIEF DESCRIPTION OF DRAWINGS

FIG. 8 is a diagram showing an example data structure of a VSDB area.

FIG. 9 is a diagram showing an example data structure of a VSIF packet.

FIG. 17 is a flowchart showing the procedures for processing content-related information in the mobile terminal 14.

MODES FOR CARRYING OUT THE INVENTION

The following is a detailed description of embodiments of the technology disclosed in this specification, with reference to the drawings.

[Example Configuration of an AV System]

Figure 1:
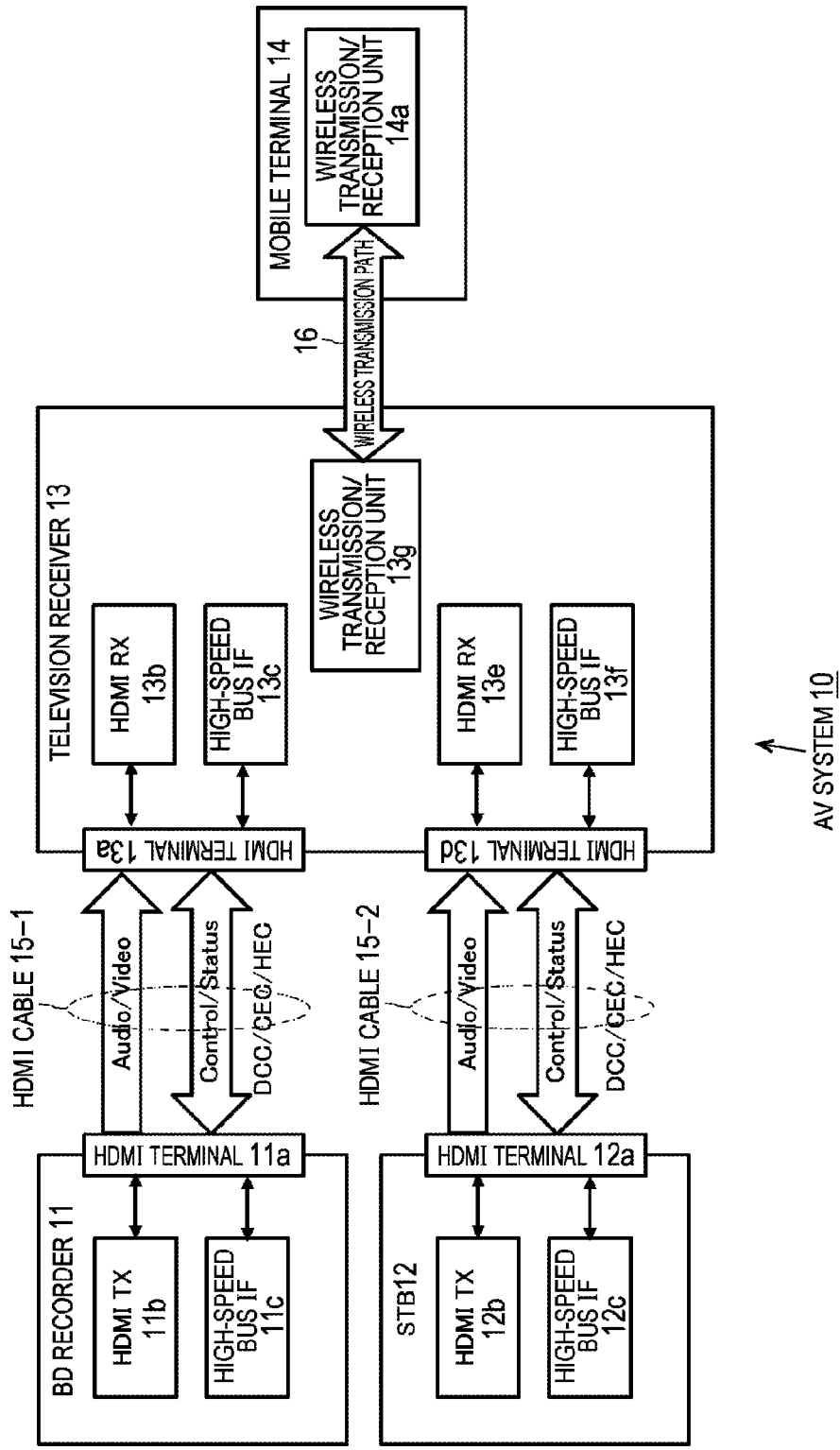
FIG. 1 is a diagram schematically showing an example configuration of an AV system 10 to which the technology disclosed in this specification is applied.

FIG. 1 schematically shows an example configuration of an AV system 10 to which the technology disclosed in this specification is applied. The AV system 10 shown in the drawing includes a BD recorder 11 and an STB 12 as HDMI source devices, a television receiver 13 as an HDMI sink device and a digital media renderer (DMR) of DLNA, and a mobile terminal 14 as an M-DMC of DLNA. The BD recorder 11 and the STB 12 are connected to the television receiver 13 via HDMI cables 15-1 and 15-2 serving as transmission paths. Further, the television receiver 13 and the mobile terminal 14 are connected to each other via a wireless transmission path 16 serving as a transmission path.

The AV system 10 has an aspect as an HDMI-based AV system formed with the BD recorder 11 or the STB 12, and the television receiver 13, and also has an aspect as a 3-Box System of DLNA formed with the BD recorder 11 or the STB 12, the television receiver 13, and the mobile terminal 14.

The BD recorder 11 is equipped with an HDMI terminal 11a to which an HDMI transmission unit (HDMI TX) 11b and a high-speed bus interface (high-speed bus I/F) 11c are connected. Likewise, the STB 12 is equipped with an HDMI terminal 12a to which an HDMI transmission unit (HDMI TX) 12b and a high-speed bus interface (high-speed bus I/F) 12c are connected. The television receiver 13 on the other end is equipped with an HDMI terminal 13a to which an HDMI reception unit (HDMI RX) 13b and a high-speedbus interface (high-speedbus I/F) 13c are connected, and an HDMI terminal 13d to which an HDMI reception unit (HDMI RX) 13e and a high-speedbus interface (high-speedbus I/F) 13f are connected. One end of the HDMI cable 15-1 is connected to the HDMI terminal 11a of the BD recorder 11, and the other end of the HDMI cable 15-1 is connected to the HDMI terminal 13a of the television receiver 13. Likewise, one end of the HDMI cable 15-2 is connected to the HDMI terminal 12a of the STB 12, and the other end of the HDMI cable 15-2 is connected to the HDMI terminal 13d of the television receiver 13.

Further, a wireless transmission/reception unit 13g for DLNA is provided in the television receiver 13. Further, a wireless transmission/reception unit 14a for DLNA is provided in the mobile terminal 14. The wireless transmission path 16 is wirelessly connected between the wireless transmission/reception unit 13g of the television receiver 13 and the wireless transmission/reception unit 14a of the mobile terminal 14.

In the AV system 10 shown in FIG. 1, uncompressed image/audio data reproduced and obtained by the BD recorder 11 is transmitted to the television receiver 13 via the HDMI cable 15-1. Meanwhile, uncompressed image/audio data obtained by the STB 12 receiving a digital broadcast is transmitted to the television receiver 13 via the HDMI cable 15-2. In the television receiver 13, the HDMI terminal 13a or 13d is selected, so that the uncompressed image/audio data transmitted from the BD recorder 11 or the STB 12 is displayed as an image and is output as sound. The input switching between the HDMI terminal 13a and the HDMI terminal 13d in the television receiver 13 can be performed by a remote control from the mobile terminal 14.

[Example Configuration of an HDMI Transmission Path]

Figure 2:
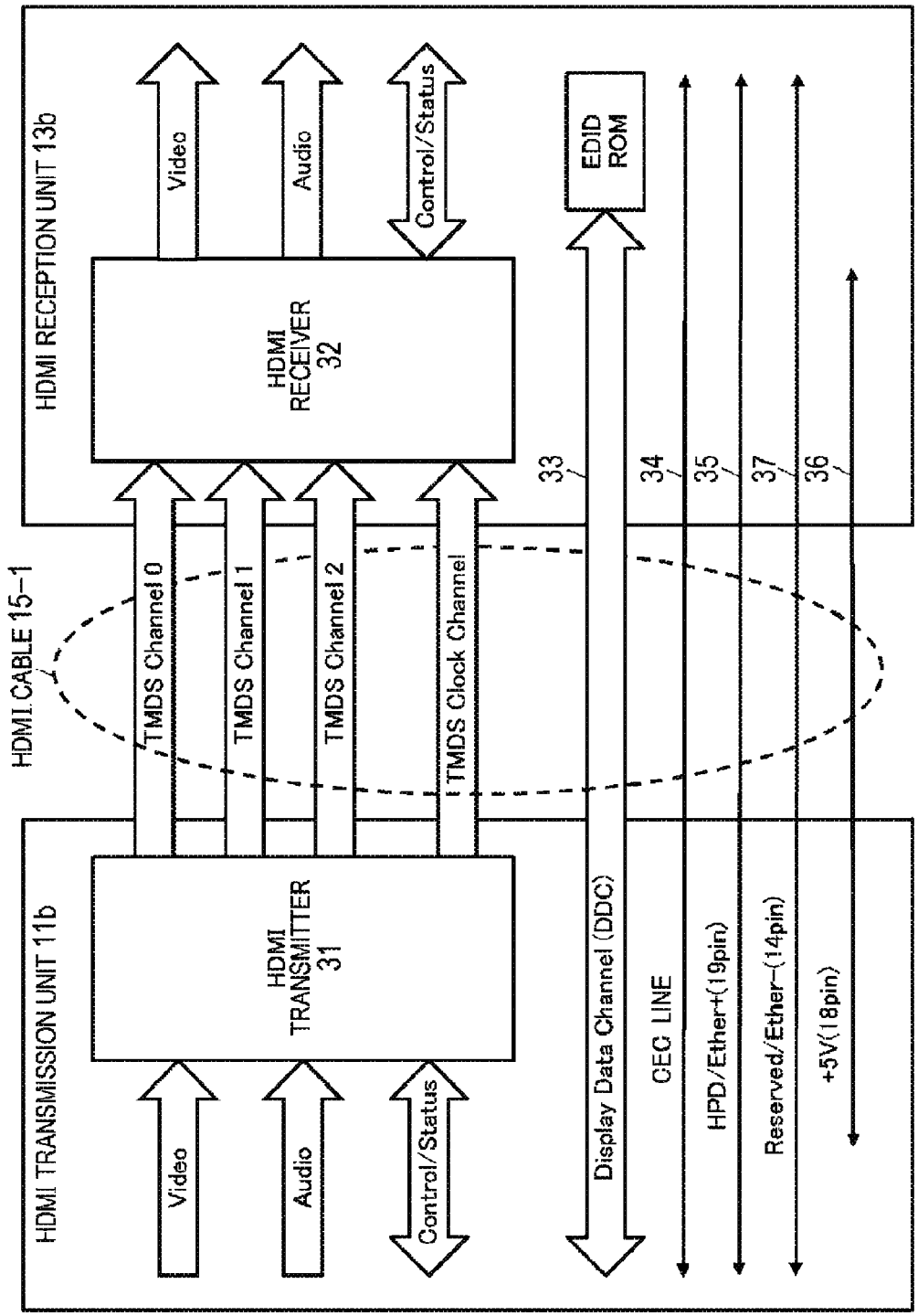
FIG. 2 is a block diagram showing the functional configurations of an HDMI transmission unit 11b in a BD recorder 11 and an HDMI reception unit 13b in a television receiver 13.

FIG. 2 shows the functional configurations of the HDMI transmission unit 11b in the BD recorder 11 and the HDMI reception unit 13b in the television receiver 13 of the AV system 10 shown in FIG. 1. Note that, although FIG. 2 shows example configurations of the HDMI transmission unit 11b and the HDMI reception unit 13b between the BD recorder 11 and the television receiver 13, the HDMI transmission unit 12b of the STB 12 and the HDMI reception unit 13e, which form another combination of a source device and a sink device, have similar internal configurations.

Figure 3:
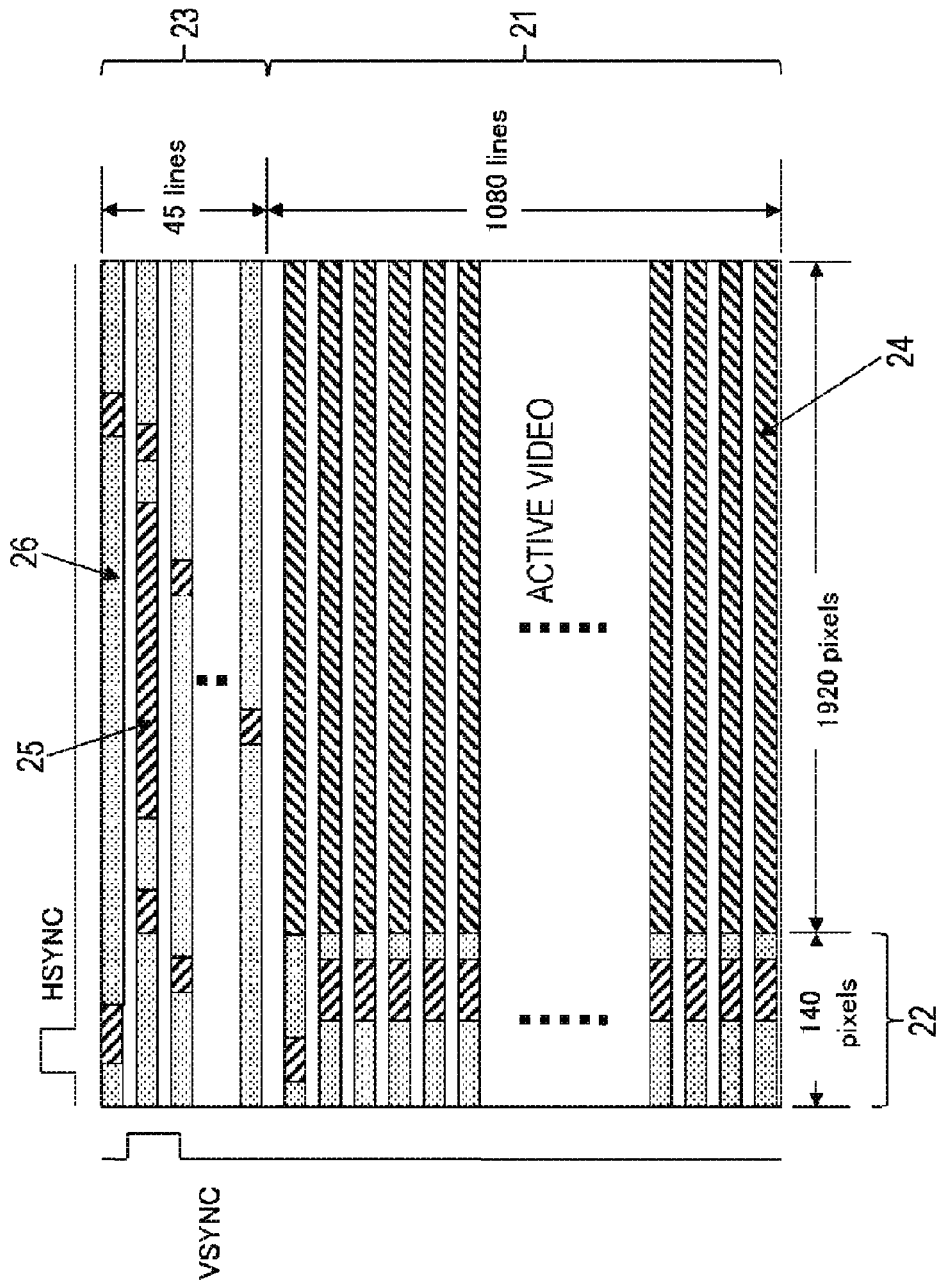
FIG. 3 is a diagram showing periods of various kinds of transmission data in a case where image data of 1920 pixels×1080 lines is transmitted through TDMS channels #0, #1, and #2.

An HDMI is a high-speed digital data transmission interface that uses transition minimized differential signaling (TMDS) for physical layers. In the example illustrated in FIG. 2, the HDMI cable 14 is formed with a total of four TMDS channels: three TDMS channels #0, #1, and #2 for transmitting three kinds of image signals of red (R), green (G), and blue (B), and one TMDS clock channel for reference. FIG. 3 shows periods of various kinds of transmission data in a case where image data of 1920 pixels×1080 lines is transmitted through the TDMS channels #0, #1, and #2.

The HDMI transmission unit 11b unidirectionally transmits the differential signal corresponding to the pixel data of an uncompressed image of one screen to the HDMI reception unit 13b through the TMDS channels #0 through #2 in an active image period 21 (hereinafter also referred to as the active video period, where appropriate) that is a period obtained by subtracting a horizontal blanking period 22 and a vertical blanking period 23 from the period from one vertical synchronization signal (VSYNC) to the next vertical synchronization signal. In the horizontal blanking period 22 or the vertical blanking period 23, the HDMI transmission unit 11b also unidirectionally transmits the differential signals corresponding to at least audio data, control data, other auxiliary data, and the like accompanying the image, to the HDMI reception unit 13b through the TMDS channels #0 through #2.

The HDMI transmission unit 11b includes an HDMI transmitter 31. The HDMI transmitter 31 converts the pixel data of an uncompressed image into the corresponding differential signal, for example, and unidirectionally and serially transmits the differential signal to the HDMI reception unit 13b through the channels, which are the three TMDS channels #0, #1, and #2.

The HDMI transmitter 31 also converts the audio data accompanying the uncompressed image, as well as the necessary control data, the other auxiliary data, and the like, into the corresponding differential signals, and unidirectionally and serially transmits the differential signals to the HDMI reception unit 13b through the three TMDS channels #0, #1, and #2. Further, the HDMI transmitter 31 transmits pixel clocks synchronized with the pixel data being transmitted through the three TMDS channels #0, #1, and #2, to the HDMI reception unit 13b through a TMDS clock channel. Here, in one TMDS channel #i (i=0, 1, 2), 10-bit pixel data is transmitted in one clock of the pixel clocks.

In the active video period 21, the HDMI reception unit 13b receives the differential signal corresponding to the pixel data transmitted unidirectionally from the HDMI transmission unit 11b through the channels. In the horizontal blanking period 22 or the vertical blanking period 23, the HDMI reception unit 13b also receives the differential signal corresponding to the audio data and the control data transmitted unidirectionally from the HDMI transmission unit 11b through the channels.

That is, the HDMI reception unit 13b includes an HDMI receiver 32. The HDMI receiver 32 receives, through the TMDS channels #0, #1, and #2, the differential signal corresponding to the pixel data transmitted unidirectionally from the HDMI transmission unit 11b connected via the HDMI cable 15-1, and the differential signals corresponding to the audio data and the control data. In this case, the reception is also synchronized with the pixel clocks transmitted from the HDMI transmission unit 11b through the TMDS clock channel.

The transmission channels in the HDMI system formed with the HDMI transmission unit 11b and the HDMI reception unit 13b include transmission channels such as a display data channel (DDC) 33 and a consumer electronics control (CEC) line 34, as well as the three TMDS channels #0, #1, and #2 serving as the transmission channels for transmitting pixel data and audio data, and the TMDS clock channel serving as the transmission channel for transmitting the pixel clocks.

The DDC 33 is formed with two signal lines included in the HDMI cable 15-1, and is used by the HDMI transmission unit 11b to read enhanced extended display identification data (E-EDID) from the HDMI reception unit 13b connected via the HDMI cable 15-1. That is, the HDMI reception unit 13b includes not only the HDMI receiver 32 but also an EDID read only memory (ROM) storing the E-EDID, which is performance information about the performance (configuration and capability) thereof.

The HDMI transmission unit 11b reads, through the DDC 33, the E-EDID of the HDMI reception unit 13b from the HDMI reception unit 13b connected thereto via the HDMI cable 15-1. Then, in accordance with the E-EDID, the HDMI transmission unit 11b recognizes the performance settings of the HDMI reception unit 13b, or the image format (profile) with which the HDMI sink device 13 including the HDMI reception unit 13b is compatible, such as RGB, YCbCr 4:4:4, or YCbCr 4:2:2.

The CEC line 34 is formed with one signal line included in the HDMI cable 15-1, and is used for performing bidirectional communication of control data between the HDMI transmission unit 11b and the HDMI reception unit 13b.

The HDMI cable 15-1 also includes an HPD/Ether+ line 35 connected to a 19-pin called hot plug detect (HPD). Using the HPD line 35, the BD recorder 11 (an HDMI source device) can detect a connection to the television receiver 13 (the HDMI sink device) in accordance with a DC bias potential. In this case, the HPD line 35 has a function to receive a notification of a connection status from the HDMI sink device in accordance with a DC bias potential, when seen from the HDMI source device side. When seen from the HDMI sink device side, on the other hand, the HPD line 35 has a function to notify the HDMI source device of a connection status according to a DC bias potential.

The HDMI cable 15-1 also includes a power supply line 36 that is used for supplying power from the HDMI source device to the HDMI sink device.

The HDMI cable 15-1 further includes a reserve/Ether− line 37 that is connected to a vacant (reserve) 14-pin. The HPD/Ether+ line 35 and the reserve/Ether− line 37 form a pair of differential transmission paths, and, in some cases, are used as a bidirectional communication path through which high-speed local area network (LAN) communication can be performed, or a high-speed bus (High speed Ether Channel: HEC). High-speed data communication through such a high-speed bus (HEC line) can be performed between the high-speed bus interface 11c in the BD recorder 11 and the high-speed bus interface 13c in the television receiver 13. Likewise, high-speed data communication through a high-speed bus (HEC line) can also be performed between the high-speedbus interface 12c in the STB 12 and the high-speed bus interface 13f in the television receiver 13.

The TDMS transmission data periods shown in FIG. 3 are now described in detail. A video field in which transmission data is transmitted through the three TMDS channels #0, #1, and #2 of the HDMI includes three kinds of periods depending on the types of the transmission data. The three kinds of periods are video data periods 24 shaded with rising diagonal strokes from bottom left to top right in the drawing, data island periods 25 shaded with falling diagonal strokes from top left to bottom right, and control periods 26 shaded with dots.

A video field is a period from the rising edge (active edge) of a vertical synchronization signal to the rising edge of the next vertical synchronization signal, and is divided into the horizontal blanking period 22, the vertical blanking period 23, and the active pixel period 21 (Active Video) that is the period obtained by subtracting the horizontal blanking period and the vertical blanking period from the video field period.

The video data periods 24 are assigned to the active pixel period 21. In the video data periods 24, data of active pixels equivalent to 1920 pixels×1080 lines, which constitute uncompressed image data of one screen, is transmitted. Meanwhile, the data island periods 25 and the control periods 26 are assigned to the horizontal blanking period 22 and the vertical blanking period 23. In the data island periods 25 and the control periods 26, auxiliary data is transmitted.

The data island periods 25 are assigned to some portions of the horizontal blanking period 22 and the vertical blanking period 23. In the data island periods 25, data unrelated to control in the auxiliary data, such as packets of audio data and the like, is transmitted. Further, the control periods 26 are assigned to the remaining portions of the horizontal blanking period 22 and the vertical blanking period 23. In the control periods 26, data related to control in the auxiliary data, such as a vertical synchronization signal, a horizontal synchronization signal (HSYNC), a control packet, and the like, is transmitted.

In this embodiment, the BD recorder 11 receives transmission scheme information about the information related to the uncompressed image/audio data with which the television receiver 13 is compatible, from the television receiver 13 via the HDMI cable 15-1. In this case, the television receiver 13 stores, in a storage unit, the transmission scheme information about the information related to the uncompressed image/audio data with which the television receiver 13 is compatible, and transmits this transmission scheme information to the BD recorder 11 via the HDMI cable 15-1. Note that there have been no transmission specifications for information related to uncompressed image/audio data. Therefore, uncompressed image/audio data could not be transferred between devices manufactured by different makers, and has been incompatible.

In accordance with the transmission scheme information received from the television receiver 13, the BD recorder 11 selects a predetermined transmission scheme from among the transmission schemes for the information related to the uncompressed image/audio data with which the television receiver 13 is compatible. In this case, the BD recorder 11 selects the transmission scheme with the highest transmission speed, if there are two or more transmission schemes for the information related to the uncompressed image/audio data with which the television receiver 13 is compatible, for example.

Then, upon receipt of information about a transmission request for the information related to the uncompressed image/audio data from the television receiver 13, the BD recorder 11 transmits the information related to the uncompressed image/audio data to the television receiver 13 via the HDMI cable 15-1 in accordance with the selected transmission scheme.

The television receiver 13 receives the transmission scheme information about the related information, and also receives the related information by the selected transmission scheme, from the BD recorder 11 via the HDMI cable 15-1. The television receiver 13 stores the received information related to the uncompressed image/audio data into a storage unit thereof.

In this embodiment, the television receiver 13 receives, from the mobile terminal 14 via the wireless transmission path 16, information about a transmission request for the information related to the uncompressed image/audio data that can be reproduced by the BD recorder 11 HDMI-connected to the television receiver 13. In this case, the television receiver 13 transmits the information related to the uncompressed image/audio data to the mobile terminal 14 via the wireless transmission path 16, the related information having been acquired from the BD recorder 11 and been stored beforehand. Alternatively, the television receiver 13 transmits the information related to the uncompressed image/audio data to the mobile terminal 14 via the wireless transmission path 16, the related information having been acquired as a result of transmission of request information to the BD recorder 11 in accordance with transmission request information from the mobile terminal 14. Note that there have been no control specifications for control on uncompressed image/audio data reproduction. Therefore, uncompressed image/audio data reproduction by an HDMI-connected HDMI source device could not be controlled by a DLNA specification.

[Example Configuration of the BD Recorder]

Figure 4:
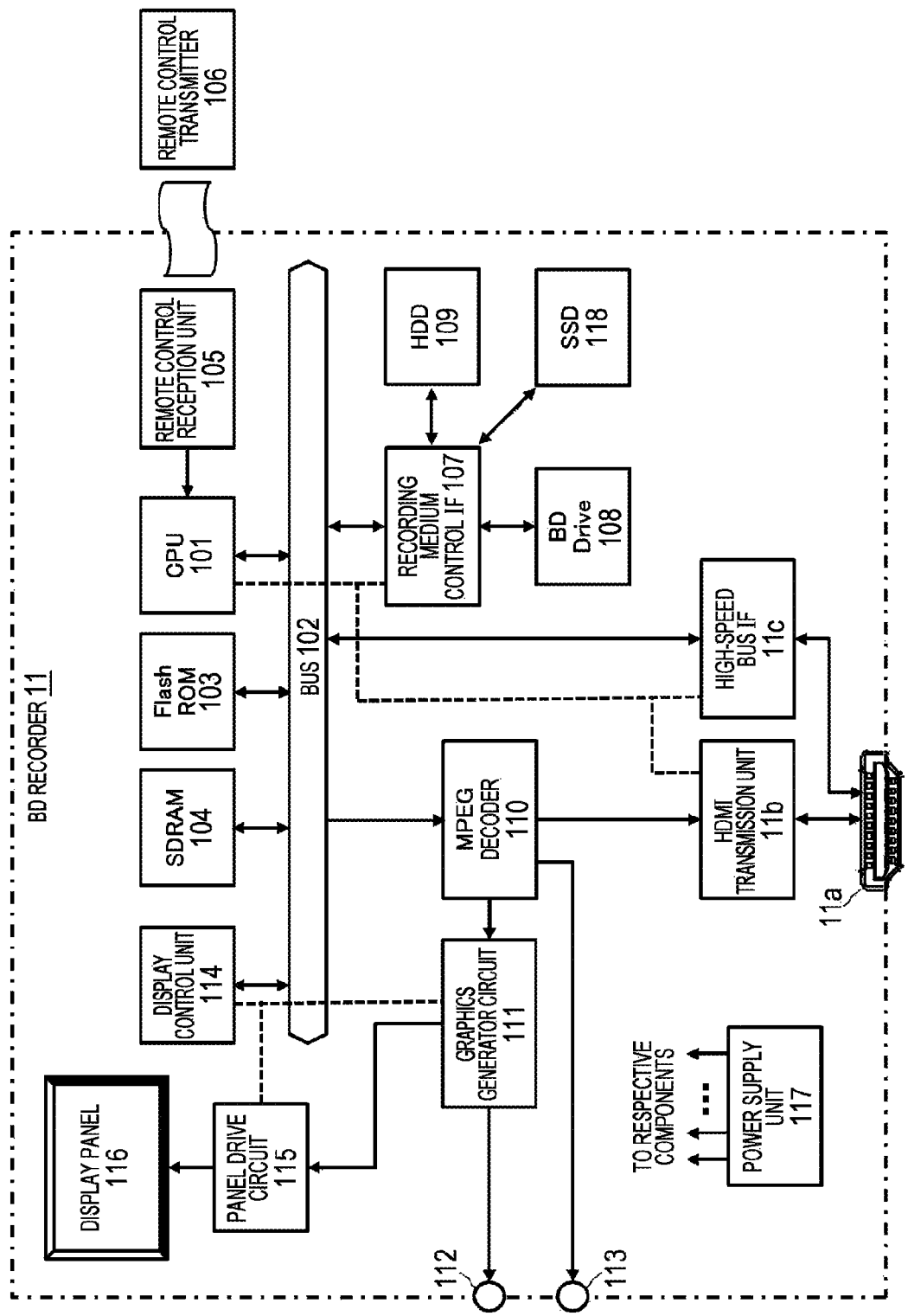
FIG. 4 is a diagram showing an example configuration of the BD recorder 11.

FIG. 4 shows an example configuration of the BD recorder 11 as an HDMI source device. The BD recorder 11 shown in the drawing includes the HDMI terminal 11a, the HDMI transmission unit 11b, and the high-speed bus interface 11c. The BD recorder 11 also includes a central processing unit (CPU) 101, an internal bus 102, a flash read only memory (ROM) 103, a synchronous random access memory (SDRAM) 104, a remote control reception unit 105, and a remote control transmitter 106.

The BD recorder 11 also includes a recording medium control interface 107, and at least one recording medium among a Blu-ray Disc (BD) drive 108, a hard disk drive (HDD) 109, and a solid state disc (SSD) 118. In a case where the BD drive 108 or the HDD 109 is included as a recording medium, a serial advanced technology attachment (SATA) interface is provided as the recording medium control interface 107. Further, in a case where the SSD 118 is included as a recording medium, a peripheral component interconnect (PCI) Express may be used as the recording medium interface 107.

The BD recorder 11 also includes a moving picture expert group (MPEG) decoder 110, a graphics generator circuit 111, an image output terminal 112, and an audio output terminal 113.

The BD recorder 11 may also include a display control unit 114, a panel drive circuit 115, a display panel 116, and a power supply unit 117. The high-speed bus interface 11c, the CPU 101, the flash ROM 103, the SDRAM 104, the remote control reception unit 105, the storage medium control interface 107, and the MPEG decoder 110 are connected to the internal bus 102. The high-speed bus interface 11c and the HDMI reception unit 11b are connected to the HDMI terminal 11a.

The CPU 101 controls operations of the respective components of the BD recorder 11. The flash ROM 103 stores control software and data. The SDRAM 104 forms a work area for the CPU 101. The CPU 101 loads software and data read from the flash ROM 103 into the SDRAM 104, and activates the software, to control the respective components of the BD recorder 11.

The remote control reception unit 105 receives a remote control signal (a remote control code) transmitted from the remote control transmitter 106, and supplies the remote control signal to the CPU 101. In accordance with the remote control code, the CPU 101 controls the respective components of the BD recorder 11. Note that, although the BD recorder 11 has the remote control transmitter 106 as a user command input unit in the example illustrated in the drawing, the user command input unit of the BD recorder 11 may be some other configuration, such as a switch, a wheel, a touch panel unit through which a command is input by approaching or touching the touch panel unit, a mouse, a keyboard, a gesture input unit that detects a command input with a camera, or a sound input unit through which a command is input by voice (any of the input units is not shown in the drawing).

The BD drive 108 records content data on a BD medium (not shown) as a disk-like recording medium, or reproduces content data from the BD medium. This BD drive 108 is connected to the internal bus 102 via the recording medium control interface 107. Further, the HDD drive 109 records content data on an HDD, or reproduces content data from the HDD. This HDD drive 109 is connected to the internal bus 102 via the recording medium control interface 107. Further, the SSD 118 records content data, or content data is reproduced from the SSD 118. This SSD 118 is connected to the internal bus 102 via the recording medium control interface 107. The MPEG decoder 110 performs a decoding process on an MPEG2 stream reproduced by the BD drive 108, the HDD drive 109, or the SSD 118, and obtains image and audio data.

The graphics generator circuit 111 performs a graphics data superimposition process or the like on the image data obtained by the MPEG decoder 110. The image output terminal 112 outputs the image data output from the graphics generator circuit 111. The audio output terminal 113 outputs the audio data obtained by the MPEG decoder 110.

The panel drive circuit 115 drives the display panel 116 in accordance with the image data output from the graphics generator circuit 111. The display control unit 114 controls the graphic generator circuit 111 and the panel drive circuit 115, to control the display on the display panel 116. The display panel 116 is formed with a liquid crystal display (LCD) or an organic electro-luminescence (EL) panel, for example.

Note that, although the display control unit 114 is provided in addition to the CPU 101 in the example configuration shown in FIG. 4, the CPU 101 may be designed to directly control the display on the display panel 116. Further, the CPU 101 and the display control unit 114 may be combined into one chip, or may form different cores. The power supply unit 117 supplies power to the respective components of the BD recorder 11. This power supply unit 117 may be an AC power supply or a battery (a storage battery or a dry cell).

The HDMI transmission unit (an HDMI source) 11b transmits baseband image and audio data from the HDMI terminal 11a to the television receiver 13 (the sink device) through HDMI-compliant communication.

The high-speed bus interface 11c is an interface of a bidirectional communication path that conducts high-speed data communication with the high-speed bus interface 13c in the television receiver 13 (an HDMI sink device) via a predetermined line (the high-speed bus HEC line formed with the pair of differential transmission paths using the HPD/Ether+ line 35 and the reserve/Ether− line 37 in this embodiment) included in the HDMI cable 15-1. This high-speed bus interface 11c is inserted between the internal bus 102 and the HDMI terminal 101. This high-speedbus interface 11c transmits transmission data supplied from the CPU 101 to the device (the HDMI sink device) on the other end, from the HDMI terminal 11a via the HDMI cable 15-1. This high-speed bus interface 11c also supplies reception data received from the device (the HDMI sink device) on the other end to the CPU 101, from the HDMI cable 15-1 via the HDMI terminal 11a.

Operation of the BD recorder 11 shown in FIG. 4 is now briefly described. At a time of recording, content data to be recorded is obtained via a digital tuner (not shown), or from the HDMI terminal 11a via the high-speed bus interface 11c. This content data is input to the recording medium control interface 107, and is recorded on a BD medium by the BD drive 108, or recorded on the HDD 109 or the SSD 118.

Meanwhile, at a time of reproduction, content data (an MPEG stream) reproduced from a BD medium by the BD drive 108 or reproduced from the HDD drive 109 or the SSD 118 is supplied to the MPEG decoder 110 via the recording medium control interface 107. In the MPEG decoder 110, a decoding process is performed on the reproduced content data, and baseband image and audio data is obtained. The image data is output from the image output terminal 112 through the graphics generator circuit 111. Further, the audio data is output from the audio output terminal 113 to the outside.

Further, at the time of reproduction, the image data obtained by the MPEG decoder 110 is supplied to the panel drive circuit 115 through the graphics generator circuit 111 in accordance with a user operation, and a reproduced image is displayed on the display panel 116. Further, the audio data obtained by the MPEG decoder 110 is supplied to a speaker (not shown) in accordance with a user operation, and the sound corresponding to the reproduced image is output.

Further, at the time of this reproduction, to transmit the image and audio data obtained by the MPEG decoder 110 through HDMI TMDS channels, the image and audio data is supplied to the HDMI transmission unit 11b, is packetized, and is then output from the HDMI transmission unit 11b to the HDMI terminal 11a.

Note that, when compressed content data read from the BD drive 108, the HDD drive 109, or the SSD 118 is transmitted to the bidirectional communication path of the HDMI cable 15-1, the compressed content data is output to the HDMI terminal 11a via the high-speed bus interface 11c. Prior to the output of the compressed content data, the compressed content data may be encrypted by a copyright protection technique, such as high-bandwidth digital content protection (HDCP), digital transmission content protection (DTCP), or DTCP+, and be then transmitted.

In this specification, the BD recorder 11 and the STB 12 have been described as HDMI source devices that can be used in an AV system to which the technology disclosed in this specification is applied. However, it is also possible to use HDMI-compliant devices of various types that transmit uncompressed image data, such as disk players for disks other than BDs, disk players, gaming machines, network attached storages (NASs), and digital video cameras.

[Example Configuration of the Television Receiver]

Figure 5:
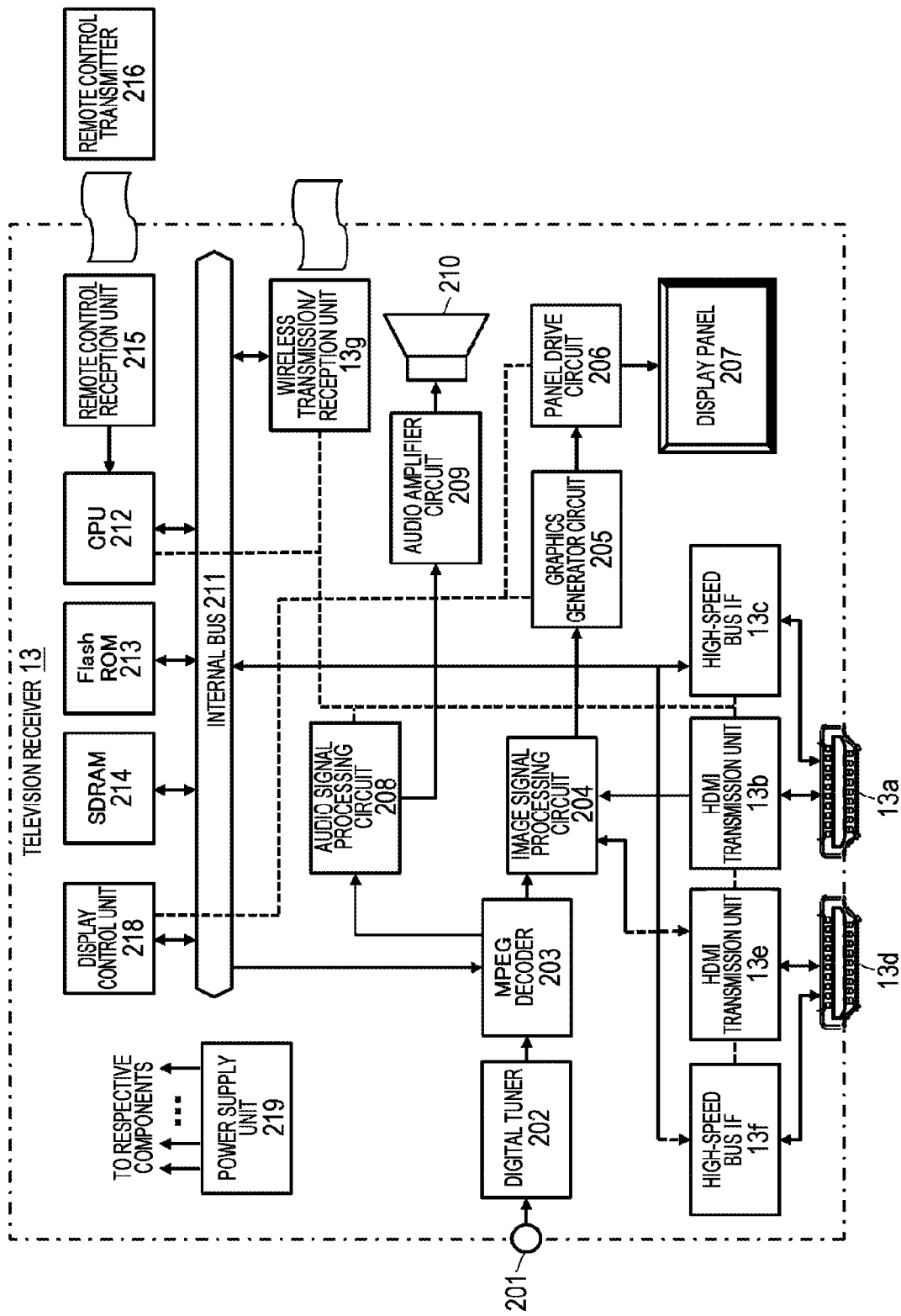
FIG. 5 is a diagram showing an example configuration of the television receiver 13.

FIG. 5 shows an example configuration of the television receiver 13 as an HDMI sink device. This television receiver 13 includes the HDMI terminals 13a and 13d, the HDMI reception units 13b and 13e, and the high-speed bus interfaces 13c and 13f. The television receiver 13 also includes an antenna terminal 201, a digital tuner 202, an MPEG decoder 203, an image signal processing circuit 204, a graphics generator circuit 205, a panel drive circuit 206, and a display panel 207.

The television receiver 13 also includes an audio signal processing circuit 208, an audio amplifier circuit 209, a speaker 210, an internal bus 211, a CPU 212, a flash ROM 213, and an SDRAM 214. The television receiver 13 also includes the wireless transmission/reception unit 13g, a remote control reception unit 215, and a remote control transmitter 216. The television receiver 13 also includes a display control unit 218 and a power supply unit 219.

The antenna terminal 201 is a terminal to which a television broadcast signal received by a reception antenna (now shown) is input. The digital tuner 202 processes the television broadcast signal input to the antenna terminal 201, and extracts a partial transport stream (TS) (a TS packet of image data and a TS packet of audio data) from the predetermined transport stream corresponding to the channel selected by the user.

The digital tuner 202 also extracts program specific information/service information (PSI/SI) from obtained transport streams, and outputs the PSI/SI to the CPU 212. A process of extracting a partial TS of a desired channel from the transport streams obtained by the digital tuner 202 can be performed by obtaining information about the packet ID (PID) of the desired channel from the PSI/SI (PAT/PMT).

The MPEG decoder 203 obtains image data by performing a decoding process on an image packetized elementary stream (PES) packet formed with the image data TS packet obtained by the digital tuner 202. The MPEG decoder 203 also obtains audio data by performing a decoding process on an audio PES packet formed with the audio data TS packet obtained by the digital tuner 202.

The image signal processing circuit 204 and the graphics generator circuit 205 perform a scaling process (a resolution conversion process), a dynamic range adjustment process, a graphics data superimposition process, and the like, as necessary, on the image data obtained by the MPEG decoder 203 or image data received by the HDMI reception unit 13b or 13d.

The panel drive circuit 206 drives the display panel 207 in accordance with the image data (image) output from the graphics generator circuit 205. The display control unit 218 controls the graphic generator circuit 205 and the panel drive circuit 206, to control the display on the display panel 207. The display panel 207 is formed with an LCD or an organic EL panel, for example.

Note that, although the display control unit 218 is provided in addition to the CPU 212 in the example shown in FIG. 5, the CPU 212 may be designed to directly control the display on the display panel 207. Further, the CPU 212 and the display control unit 218 may be combined into one chip, or may form different cores. The power supply unit 219 supplies power to the respective components of the television receiver 13. This power supply unit 219 may be an AC power supply or a battery (a storage battery or a dry cell).

The audio signal processing circuit 208 performs processing such as D/A conversion on the audio data obtained by the MPEG decoder 203. The audio amplifier circuit 209 amplifies the audio signal output from the audio signal processing circuit 208, and supplies the audio signal to the speaker 210. Note that the speaker 210 may be either a monaural speaker or a stereo speaker. Further, the speaker 210 may be formed with one speaker, or may be formed with two or more speakers. Further, the speaker 210 may be earphones or headphones. Further, the speaker 210 may be compatible with 2.1-channel, 5.1-channel, and the like. Further, the speaker 210 may be wirelessly connected to the television receiver 13. Further, the speaker 210 may be another device that is externally connected to the television receiver 13.

The CPU 212 controls operations of the respective components of the television receiver 13. The flash ROM 213 stores control software and data. The SDRAM 214 forms a work area for the CPU 212. The CPU 212 loads software and data read from the flash ROM 213 into the SDRAM 214, and activates the software, to control the respective components of the television receiver 13.

The remote control reception unit 215 receives a remote control signal (a remote control code) transmitted from the remote control transmitter 216, and supplies the remote control signal to the CPU 212. In accordance with this remote control code, the CPU 212 controls the respective components of the television receiver 13. Note that, although the television receiver 13 has the remote control transmitter as a user command input unit in the example illustrated in FIG. 5, the user command input unit of the television receiver 13 may be some other configuration, such as a touch panel unit through which a command is input with by approaching or touching the touch panel unit, a mouse, a keyboard, a gesture input unit that detects a command input with a camera, or a sound input unit through which a command is input by voice (any of the input units is not shown in the drawing).

The high-speed bus interfaces 13*c* and 13*f*, the CPU 212, the flash ROM 213, the SDRAM 214, the wireless transmission/reception unit 13*g*, the MPEG decoder 203, and the display control unit 218 are connected to the internal bus 211. Further, the high-speed bus interface 13*c* and the HDMI reception unit 13*b* are connected to the HDMI terminal 13*a*, and the high-speed bus interface 13*f* and the HDMI reception unit 13*e* are connected to the HDMI terminal 13*d*.

By performing communication compliant to HDMI, the HDMI reception units (HDMI sinks) 13*b* and 13*e* receive uncompressed image/audio data supplied to the HDMI terminals 13*a* and 13*d* via the HDMI cables 15-1 and 15-2.

Like the above described high-speed bus interface 11*c* of the BD recorder 11, the high-speed bus interfaces 13*c* and 13*f* are interfaces of bidirectional communication paths that conduct high-speed data communication with the high-speed bus interfaces 11*c* and 12*c* in the BD recorder 11 and the STB 12 via a predetermined line (the high-speed bus (HEC line) formed with the pair of differential transmission paths using the HPD/Ether+ line 35 and the reserve/Ether− line 37 in this embodiment) included in the HDMI cables 15-1 and 15-2. The high-speed bus interfaces 13*c* and 13*f* are inserted between the internal bus 211 and the HDMI terminal 13*a* or 13*d*. The high-speed bus interfaces 13*c* and 13*f* transmit transmission data supplied from the CPU 212 to the device (an HDMI source device) on the other end, from the HDMI terminal 13*a* or 13*d* via the HDMI cable 15-1 or 15-2. The high-speedbus interfaces 13*c* and 13*f* also supply reception data received from the device (an HDMI source device) on the other end to the CPU 212, from the HDMI cable 15-1 or 15-2 via the HDMI terminal 13*a* or 13*d*.

Note that, when received compressed content data is transmitted or received via the bidirectional communication path of the HDMI cable 15-1 or 15-2, the compressed content data is input to or output from the HDMI terminal 13*a* or 13*d* via the high-speed bus interface 13*c* or 13*f*. Prior to the output of the compressed content data, the compressed content data may be encrypted by a copyright protection technique, such as HDCP, DTCP, or DTCP+, and be then transmitted.

The wireless transmission/reception unit 13*g* conducts wireless communication between the CPU 101 and an external device via the internal bus 102. The wireless transmission/reception unit 13*g* conducts wireless communication in compliance with wireless communication standards, such as wireless fidelity (Wi-Fi (registered trademark)), Bluetooth (registered trademark) communication, or Bluetooth (registered trademark) low energy (BLE) communication. In the example configuration of the AV system 10 shown in FIG. 1, the mobile terminal 14 is provided as the external device, and wireless communication for DLNA is to be performed, for example.

Operation of the television receiver 13 shown in FIG. 5 is now briefly described. A television broadcast signal input to the antenna terminal 201 is supplied to the digital tuner 202. In the digital tuner 202, the television broadcast signal is processed, the predetermined transport stream corresponding to the channel selected by the user is output, a partial TS (a TS packet of image data and a TS packet of audio data) is extracted from the transport stream, and the partial TS is supplied to the MPEG decoder 203.

The MPEG decoder 203 obtains image data by performing a decoding process on the image PES packet formed with the image data TS packet. This image data is subjected to a scaling process (a resolution conversion process), a dynamic range adjustment process, a graphics data superimposition process, and the like, as necessary, in the image signal processing circuit 204 and the graphics generator circuit 205, and is then supplied to the panel drive circuit 206. Thus, the image corresponding to the channel selected by the user is displayed on the display panel 207.

The MPEG decoder 203 also obtains audio data by performing a decoding process on the audio PES packet formed with the audio data TS packet. This audio data is subjected to necessary processing such as D/A conversion in the audio signal processing circuit 208. Further, the audio data is amplified in the audio amplifier circuit 209, and is then supplied to the speaker 210. Thus, the sound corresponding to the channel selected by the user is output from the speaker 210.

Further, compressed content data supplied from the HDMI terminal 13*a* or 13*d* via the high-speed bus interface 13*c* or 13*f* is supplied to the MPEG decoder 203 through the internal bus 211. Thereafter, the same operation as the above described operation at a time of reception of a television broadcast signal is performed, so that an image is displayed on the display panel 207, and sound is output from the speaker 210.

Further, the HDMI reception unit 13*b* or 13*e* obtains uncompressed image/audio data transmitted from an HDMI source device such as the BD recorder 11 or the STB 12 connected to the HDMI terminal 13*a* or 13*d* via the HDMI cable 15-1 or 15-2. The image data is supplied to the image signal processing circuit 204. Meanwhile, the audio data is supplied directly to the audio signal processing circuit 208. Thereafter, the same operation as the above described operation at a time of reception of a television broadcast signal is performed, so that an image is displayed on the display panel 207, and sound is output from the speaker 210.

Note that, In this specification, the television receiver 13 has been described as an HDMI sink device that can be used in an AV system to which the technology disclosed in this specification is applied. However, it is also possible to use HDMI-compliant devices of other various kinds that display and output uncompressed image data, such as a projector and a personal computer.

[Example Configuration of the Mobile Terminal]

Figure 6:
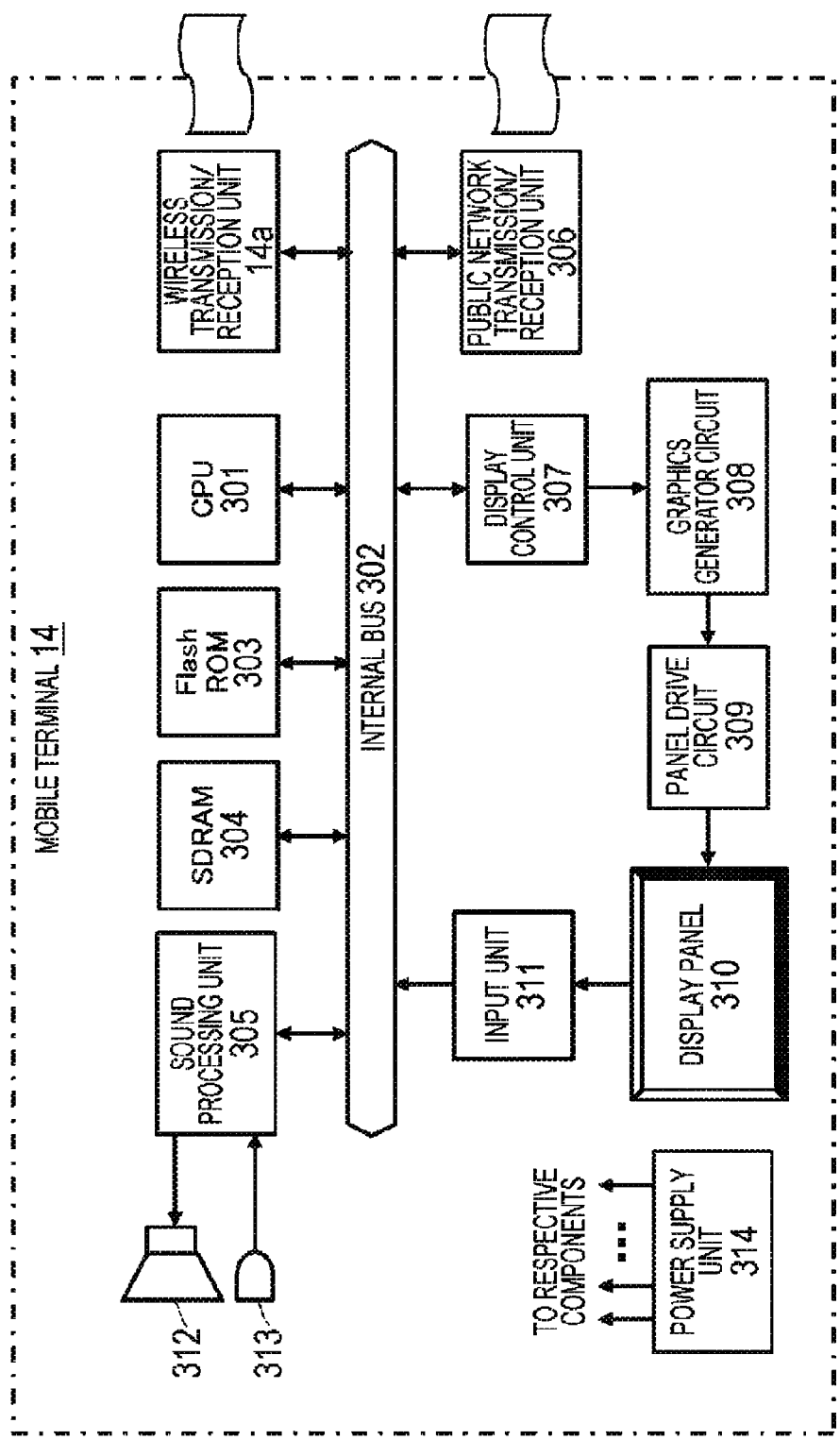
FIG. 6 is a diagram showing an example configuration of a mobile terminal 14.

The mobile terminal 14 operates as a DMC in a 3-Box System of DLNA, for example. FIG. 6 shows an example configuration of the mobile terminal 14. This mobile terminal 14 includes the wireless transmission/reception unit 14a and a public telephone network transmission/reception unit 306. This mobile terminal 14 also includes a CPU 301, an internal bus 302, a flash ROM 303, an SDRAM 304, a sound processing unit 305, a speaker 312, and a sound input microphone 313.

The mobile terminal 14 also includes a display control unit 307, a graphics generator circuit 308, a panel drive circuit 309, a display panel 310, an input unit 311, and a power supply unit 314.

The wireless transmission/reception unit 14a, the CPU 301, the flash ROM 303, the SDRAM 304, the sound processing unit 305, the public network transmission/reception unit 306, the display control unit 307, and the input unit 311 are connected to the internal bus 302.

The CPU 301 controls operations of the respective components of the mobile terminal 14. The flash ROM 303 stores control software and data. The SDRAM 304 forms a work area for the CPU 301. The CPU 301 loads software and data read from the flash ROM 303 into the SDRAM 304, and activates the software, to control the respective components of the mobile terminal 14.

The wireless transmission/reception unit 14a conducts wireless communication between the CPU 301 and an external device via the internal bus 302. The wireless transmission/reception unit 14a conducts wireless communication in compliance with wireless communication standards, such as wireless fidelity (Wi-Fi (registered trademark)), Bluetooth (registered trademark) communication, or Bluetooth (registered trademark) low energy (BLE) communication. In the example configuration of the AV system 10 shown in FIG. 1, the television receiver 13 is provided as the external device, and wireless communication for DLNA is to be performed, for example.

The public network transmission/reception unit 306 conducts communication between the CPU 301 and a public network via the internal bus 302. The sound processing unit 305 processes audio data output from the CPU 301, and outputs the audio data to the speaker 312. The sound processing unit 306 also processes sound input from the microphone 313, and outputs audio data to the CPU 301.

The graphics generator circuit 308 performs a graphics data superimposition process or the like, as necessary, on image data obtained by the CPU 301. The panel drive circuit 309 drives the display panel 310 in accordance with the image data output from the graphics generator circuit 308. The display control unit 307 controls the graphic generator circuit 308 and the panel drive circuit 309, to control the display on the display panel 310. The display panel 310 is formed with an LCD or an organic EL panel, for example.

A user input can be made to the display panel 310 through a touch panel. The user input through the touch panel is detected by the input unit 311, and is supplied to the CPU 301 via the internal bus 302, to control the respective components of the mobile terminal 14. Note that, although the input unit 311 is shown as a user command input unit in the example illustrated in the drawing, the user command input unit of the mobile terminal 14 may be some other configuration, such as a switch, a wheel, a gesture input unit that detects a command input with a camera, or a sound input unit through which a command is input by voice.

Note that, although the display control unit 307 is provided in addition to the CPU 301 in the example shown in FIG. 6, the CPU 301 may be designed to directly control the display on the display panel 310. Further, the CPU 301 and the display control unit 307 may be combined into one chip, or may form different cores. Further, the display control unit 307 and the graphics generator circuit 308 may be combined into one chip, or may form different cores. The power supply unit 314 supplies power from a storage battery to the respective components of the mobile terminal 14.

Operation of the mobile terminal 14 shown in FIG. 6 is now briefly described. At a time of audio communication, audio data obtained by the public network transmission/reception unit 306 is supplied to the sound processing unit 305 via the internal bus 302. The sound processing unit 305 obtains baseband sound by performing a decoding process on the input audio data, and outputs the sound from the speaker 312. Meanwhile, sound that is input from the microphone 313 is subjected to an encoding process to obtain audio data in the sound processing unit 305, and is output to the public network transmission/reception unit 306 via the internal bus 302.

Further, at a time of data communication, data obtained by the public network transmission/reception unit 306 is stored into the SDRAM 304 via the internal bus 302. The CPU 301 converts the stored data into display screen data, and outputs the display screen data to the display control unit 307. The display control unit 307 supplies the screen data to the panel drive circuit 309 via the graphics generator circuit 308, and a data communication screen is displayed on the display panel 310. Further, in accordance with a user operation performed on the screen displayed on the display panel 310, the input unit 311 supplies screen control information to the CPU 301 via the internal bus 302.

Meanwhile, when controlling an HDMI source device, the mobile terminal 14 transmits a data transmission request for a content list or the like to the television receiver 13 via the wireless transmission/reception unit 14a and the wireless transmission path 16. Related information and additional information from the television receiver 13, such as a content list, are received by the wireless transmission/reception unit 14a, and are displayed on the display panel 310, as in the above described process at a time of data communication.

The user operates a screen of information such as a content list displayed on the display panel 310. When content of an HDMI source device is selected on the screen, the input unit 311 detects the related information and the additional information associated with the content, and outputs the information to the CPU 301. The CPU 301 generates a request for control on content of the HDMI source device, and transmits the request to the television receiver 13 via the wireless transmission/reception unit 14a.

Examples of mobile terminals that can be used in an AV system to which the technology disclosed in this specification is applied include various devices having wireless communication functions, such as smartphones, tablet terminals, electronic books, and notebook computers.

[Example Data Structure of EDID]

Figure 7:
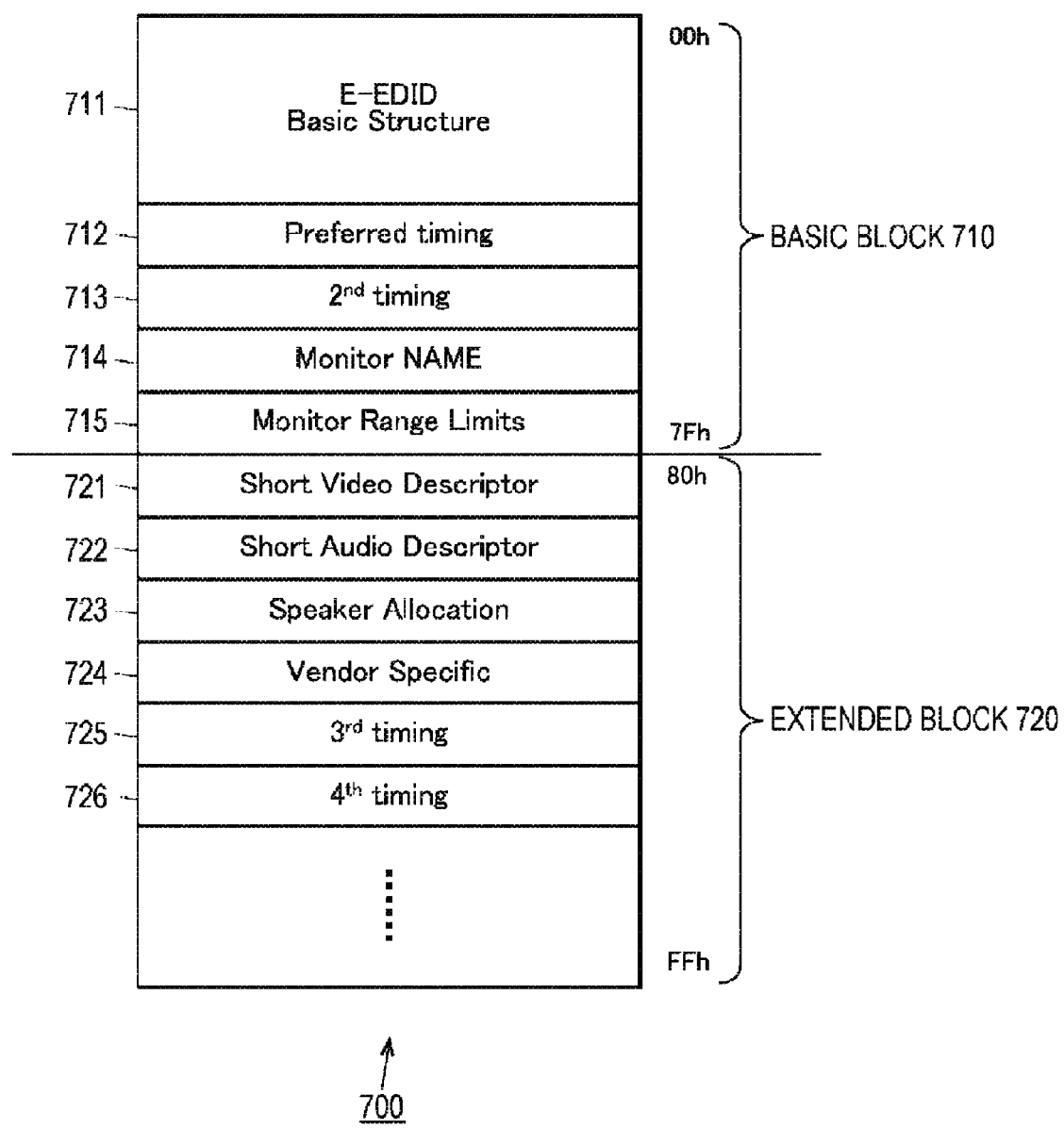
FIG. 7 is a diagram showing an example data structure of E-EDID.

As described above, the HDMI reception unit 13b in the television receiver 13 stores, in an EDID ROM, E-EDID as the performance information about the television receiver 13. FIG. 7 shows an example data structure 700 of the E-EDID. This E-EDID 700 is formed with a basic block 710 and an extended block 720.

At the top of the basic block 710, data 711 that is represented by "E-EDID 1.3 Basic Structure" and is specified in the E-EDID 1.3 standard is provided, followed by timing information 712 that is represented by "Preferred timing" and is used for maintaining compatibility with the conventional EDID, and timing information 713 that is represented by "2nd timing", is used for maintaining compatibility with the conventional EDID, and differs from "Preferred timing".

Further, in the basic block 710, "2nd timing" is followed sequentially by information 714 that is represented by "Monitor NAME" and indicates the name of the display device, and information 715 that is represented by "Monitor Range Limits" and indicates the number of pixels that can be displayed in a case where the aspect ratio is 4:3 or 16:9.

At the top of the extended block 720, the following data is sequentially provided: data that is represented by "Short Video Descriptor" and contains a displayable image size (resolution) 721, a frame rate, information indicating whether it is of an interlace type or a progressive type, information about an aspect ratio and the like; data that is represented by "Short Audio Descriptor" and contains information 722 about a reproducible audio codec format, a sampling frequency, a cutoff band, the number of codec bits, and the like; and information 723 that is represented by "Speaker Allocation" and concerns the right and left speakers.

Further, in the extended block 720, "Speaker Allocation" is followed by a data block (VSDB) 724 that is represented by "Vender Specific" and is uniquely defined for each maker, timing information 725 that is represented by "3rd timing" and is used for maintaining compatibility with the conventional EDID, and timing information 726 that is represented by "4th timing" and is used for maintaining the compatibility with the conventional EDID.

[Example Data Structure of the Vendor Specific Data Block (VSDB) Area]

In this embodiment, a data area to be extended for storing transmission scheme information about the information related to uncompressed image/audio data is defined in this VSDB area. FIG. 8 shows an example data structure 800 of the VSDB area. In this VSDB area, 0th through Nth blocks each being a 1-byte block are provided.

The data area of the transmission scheme information about the information related to uncompressed image/audio data to be stored in the sink device (the television receiver 13 in this embodiment) is defined in the fourth bit in the eighth byte and in the 14th byte following the 0th through 13th bytes, which have been already defined.

First, the 0th through eighth byes are described. A header that is represented by "Vendor-Specific tag code (=3)" and indicates the data area, and information that is represented by "Length(=N)" and indicates the length of VSDB data are provided in the 0th byte located at the top of the data represented by "Vender Specific". Further, information that is represented by"24-bit IEEE Registration Identifier (0x000C03) LSB first" and indicates the number "(0x000C03)" registered for the HDMI is provided in the first through third bytes.

Information that is represented by "A", "B", "C", and "D", and indicates the 24-bit physical address of a sink device is provided in the fourth and fifth bytes. In the sixth byte, the following flags are provided: a flag that is represented by "Supports-AI" and indicates the functions with which the sink device is compatible; flags that are represented by "DC-48 bit", "DC-36 bit", and "DC-30 bit", respectively, and indicates the information that specifies the numbers of bits per pixel; a flag that is represented by "DC-Y444" and indicates whether the sink device is compatible with transmission of an image of YCbCr 4:4:4; and a flag that is represented by "DVI-Dual" and indicates whether the sink device is compatible with a dual digital visual interface (DVI).

Further, information that is represented by "Max-TMDS-Clock" and indicates the highest frequency of a TMDS pixel clock is provided in the seventh byte. In the eighth byte, the following information is provided: information specifying the existence of a Latency field; information specifying the existence of an Interlace Latency field; information specifying the existence of an extension of the information related to uncompressed image/audio data; and flags CNC3 through CNC0 of information specifying the supported functions of content types (CNC). A flag (List_Query_Extension) indicating whether there exists extended information about the related information transmission schemes with which the sink device is compatible is newly provided in the fourth bit in the eighth byte. If this flag is "True", the information about the related information transmission schemes exists in the 14th byte.

Next, the 14th byte is described. Data indicating three compatible transmission schemes that are the related information transmission schemes with which the HDMI sink device (the television receiver 13 in this embodiment) is compatible is written in the seventh through fifth bits in the 14 bytes. If other schemes are suggested, the fourth through 0th bits in the 14th bytes can be allotted to the suggested schemes.

For example, if the seventh bit is "True", the HDMI sink device can receive the related information through the CEC line 34. If the sixth bit is "True", the HDMI sink device can receive the related information through a vendor specific infoframe (VSIF) inserted between the data island periods 25 (or the control periods 26) in TMDS transmission data. If the fifth bit is "True", the HDMI sink device can receive the related information through the HEC line (the high-speed bus interfaces 13c and 13f).

The example shown in FIG. 8 suggests a method of storing transmission scheme information about the information related to uncompressed image/audio data using the VSDB area. However, in the data structure of E-EDID, some other data area can be used as with a video capability data block (VCDB), and the technology disclosed in this specification is not limited to the storage method using the VSDB area.

In the AV system 10 shown in FIG. 1, the CPU 101 of the BD recorder (a source device) 11 confirms a connection of the television receiver (a sink device) 13 through the HPD line 35 (see FIG. 2). After that, the CPU 101 of the BD recorder 11 uses the DDC 33 (see FIG. 2) to read the transmission scheme information about the information related to uncompressed image/audio data in the E-EDID from the television receiver 13, and recognizes the related information transmission schemes with which the television receiver 13 is compatible.

In the AV system 10 shown in FIG. 1, when transmitting the information related to uncompressed image/audio data to the television receiver 13, the BD recorder 11 selects a transmission scheme from among the related information transmission schemes with which the television receiver 13 is compatible, in accordance with the transmission scheme information read from the television receiver 13 as described above. The BD recorder 11 then transmits the related information. In doing so, the BD recorder 11 also transmits the information about the transmission scheme for the currently-transmitted related information to the television receiver 13.

The BD recorder 11 can insert the information about the transmission scheme for the currently-transmitted related information into the blanking period of the uncompressed image/audio data to be transmitted to the television receiver 13, and transmit the information, together with the related information, to the television receiver 13. Here, the BD recorder 11 uses an HDMI Vendor Specific InfoFrame (hereinafter referred to as "VSIF") packet or the like, to insert the currently-transmitted related information into the blanking period of the uncompressed image/audio data. A VSIF packet is provided in the above described data island periods 25 (or the control periods 26) (see FIG. 3).

Alternatively, the BD recorder 11 can transmit the information related to the uncompressed image/audio data and the information related to the transmission scheme as an IP packet to the television receiver 13 via the CEC line 34 or the bidirectional high-speed bus interface (HEC line) formed with a pair of differential transmission paths using the HPD/Ether+ line 35 and the reserve/Ether− line 37.

[Example Data Structure of a VSIF Packet]

FIG. 9 shows an example data structure of a VSIF packet 900. In an HDMI, the information related to uncompressed image/audio data can be transmitted from an HDMI source device to an HDMI sink device with this VSIF packet.

A data check sum is defined in the 0th byte in the VSIF packet 900. Information that is represented by "24-bit IEEE Registration Identifier (0x000C03) LSB first" and indicates the number "(0x000C03)" registered for the HDMI is provided in the first through third bytes.

Information indicating whether the information related to the uncompressed image/audio data is to be transmitted with a VSIF packet is specified in the 0th bit in the fourth byte. If the 0th bit is set to the high level "1", the information related to the uncompressed image/audio data is to be transmitted with a VSIFF packet. If the 0th bit is set to the low level "0", the information related to the uncompressed image/audio data is not to be transmitted with a VSIF packet.

In a case where the 0th bit in the fourth byte is set to the high level "1", and the information related to the uncompressed image/audio data is transmitted with a VSIF packet, the information related to the uncompressed image/audio data is specified in the sixth and later bytes. In this case, the total number of pieces of the information related to the uncompressed video/audio data is represented by "Number of Content (N)", and is specified in the sixth byte. The number of bytes in the first piece of the information related to the uncompressed image/audio data to be transmitted is represented by "Length#1 (=L)", and is specified in the seventh byte. The play duration of the first piece of the uncompressed image/audio data to be transmitted is represented by "Duration#1 (min)", and is specified in the eighth and ninth bytes. The title of the first piece of the uncompressed image/audio data to be transmitted is represented by "Title#1", and is specified in the 10th through (8+L)th bytes. Note that the information related to the uncompressed image/audio data may include some other information, such as thumbnails of the content.

In the bytes thereafter, the above is repeated the same number of times as the total number N of pieces of the information related to the first piece of the uncompressed video/audio data to be transmitted minus 1, and the numbers of bytes, the play durations, and the titles of the respective pieces of the uncompressed image/audio data are specified.

[Example Data Structure of an IP Packet]

Figure 10:
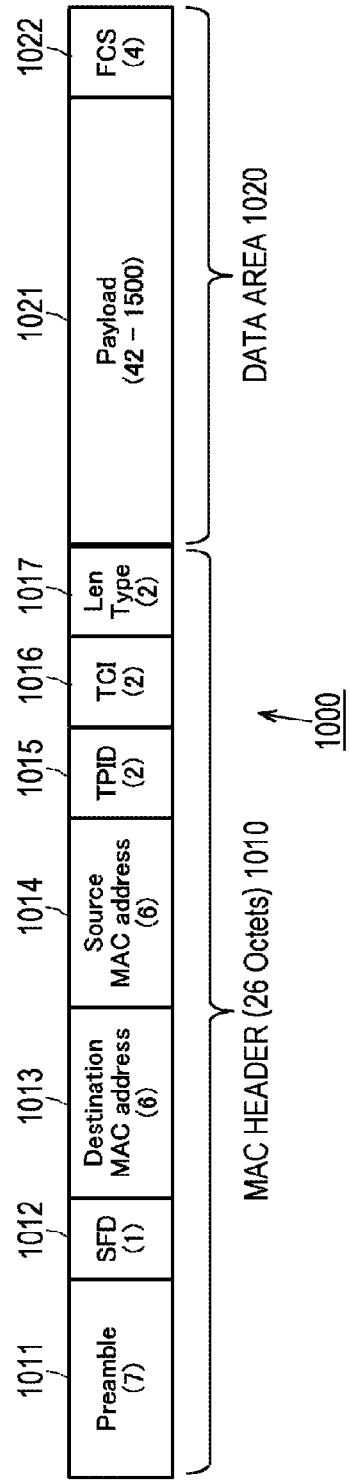
FIG. 10 is a diagram showing an example data structure of an IP packet to be used in a bidirectional high-speed bus interface.

FIG. 10 shows an example data structure 1000 of an IP packet to be used in a bidirectional high-speed bus interface (HEC line). In an HDMI, the information related to uncompressed image/audio data can be transmitted from an HDMI source device to an HDMI sink device with this IP packet that is used in a bidirectional high-speed bus interface.

As shown in the upper portion of FIG. 10, the IP packet 1000 is formed with a 26-octet MAC header 1010 and a data area 1020 of a variable length. The MAC header 1010 is formed with a 7-octet preamble portion 1011, a 1-octet start frame delimiter (SFD) 1012, a 6-octet destination MAC address 1013, a 6-octet source MAC address 1014, a 2-octet tag protocol identifier (TPID) 1015, 2-octet tag control information (TCI) 1016, and a 2-octet data length format (Len Type) 1017. The MAC header 1010 is followed by the data area 1020 that is formed with a 42- to 1500-octet payload portion 1021 and a 4-octet frame check sequence (FCS) 1022.

The information related to the uncompressed image/audio data is inserted into the payload portion 1021 of the IP packet 1000, and is in the same format as the transmission data structure of the above described VSIF packet. The lower portion of FIG. 10 shows an example data structure 1030 of the related information to be inserted into the payload portion 1021. Identification information (id) representing the packet of the information related to the uncompressed image/audio data is set in the first byte. The total number of pieces of the information related to the uncompressed image/audio data to be transmitted minus 1 (number_Content_minus 1) is set in the next byte. The loop is repeated the same number of times as "number_Content_minus 1", and each loop is formed with a data length (length), content play duration information (Duration), and a title (Title), and forms one data block. Note that the information related to the uncompressed image/audio data may include some other information, such as thumbnails of the content.

[Example Data Structure of a CEC Packet]

Figure 11:
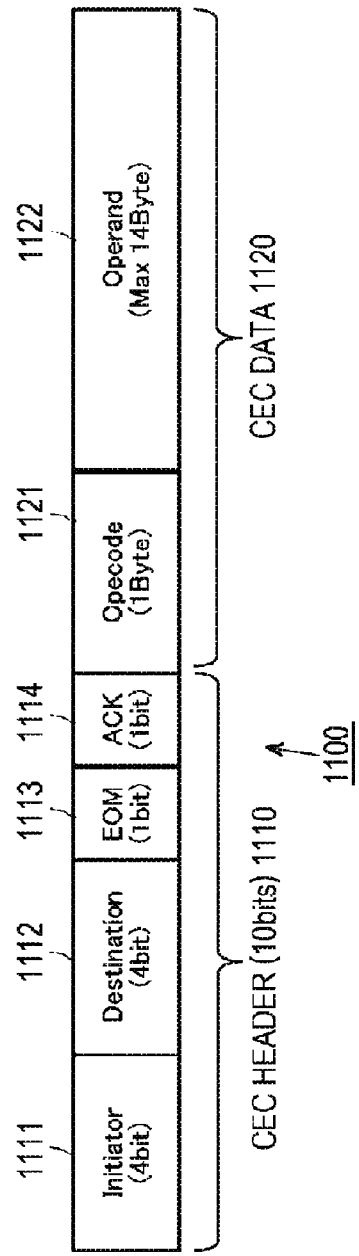
FIG. 11 is a diagram showing an example data structure of a CEC packet.

FIG. 11 shows an example data structure of a CEC packet 1100 to be used in the CEC line 34. Although the transmission rate of the CEC line 34 is low, the information related to uncompressed image/audio data can be transmitted from an HDMI source device to an HDMI sink device through the CEC line 34.

As shown in the upper portion of FIG. 11, the CEC packet 1100 is formed with a 10-bit CEC header 1110 and CEC data 1120. The CEC header 1110 is formed with a 4-bit initiator CEC address 1111 represented by "Initiator", a 4-bit destination CEC address 1112 represented by "Destination", a 1-bit end of message (EOM) 1113, and a 1-bit acknowledge (ACK) 1114. The CEC header 1110 is followed by the CEC data 1120 that is formed with a 1-byte control code (Opecode) 1121, and a control data portion (Operand) 1122 of 14 bytes at a maximum.

The lower portion of FIG. 11 shows an example extension 1130 of an HDMI CEC command. As for CEC control codes, a control code "0xC8" is newly assigned as a request command for transmission of the information related to the uncompressed image/audio data, and a control code "0xC9" is newly assigned as a response to the transmission request command. The response command can transmit a maximum of 255-byte of play duration information (Duration) and a title (Title) of each piece of content with the control data portion 1122 after the control code "0xC9". Note that, although not shown in FIG. 11, the information related to the uncompressed image/audio data may include some other information, such as thumbnails of the content. However, the control data portion 1122 of the CEC packet is 14 bytes in length at a maximum (as described above). When information longer than 14 bytes is transmitted, the above described EOM bit is used to indicate the existence of the control data portion 1122 that follows. That is, "0" in the EOM bit indicates that there exists a data block that follows. Meanwhile, "1" in the EOM bit indicates that data block transmission has been completed.

As the EOM bit is used in this manner, a data block longer than 14 bytes can be transmitted with the CEC packet 1100. One piece of the information related to the uncompressed image/audio data can be transmitted with one transmission request command. To obtain more than one piece of the related information, a transmission request command should be repeatedly transmitted. In this manner, pieces of the related information can be obtained. When a response command returns "Abort" as the control data portion 1122 to a transmission request command, the HDMI sink device on the receiving end determines that there is no more related information, and can end the transmission request process.

Further, to obtain the transmission scheme information about the information related to the uncompressed image/audio data through the CEC line 34, a control code "0xCA" is newly assigned as a transmission scheme information request command, and a control code "0xCB" is newly assigned as a response to the command. In a case where a transmission scheme information request command is to be transmitted, information indicating which one of the three transmission schemes for the information related to the uncompressed image/audio data is specified in the first and 0th bits in the control data portion 1122. In a case where "0b11" is set in the first and 0th bits, the related information is to be transmitted through a bidirectional high-speed bus interface (HEC line). In a case where "0b10" is set in the first and 0th bits, the related information is to be transmitted with a VSIF packet in the data island periods 25 (or the control periods 26). In a case where "0b01" is set in the first and 0th bits, the related information is to be transmitted with a CEC packet using the CEC line 34. In a case where "0b00" is set in the first and 0th bits, the information related to the uncompressed image/audio data is not to be transmitted. If other schemes are suggested, the seventh through second bits can be allotted to the suggested schemes.

Note that, although this specification suggests a method of transmitting the information related to uncompressed image/audio data using a VSIF packet, the transmission can be performed with some other data packet, such as an auxiliary video (AV) InfoFrame, and therefore, the invention is not limited to the suggested method.

[Example Data Structures of Related Information and Additional Information]

In the AV system 10 according to this embodiment, an HDMI sink device such as the television receiver 13 adds additional information to the information related to the uncompressed image/audio data received from an HDMI source device such as the BD recorder 11, and then transmits the information to the mobile terminal 14.

Figure 12:
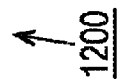
FIG. 12 is a diagram showing a data structure that forms content information by adding additional information to the information related to uncompressed image/audio data, and transmits the content information.

FIG. 12 shows a data structure 1200 that has content information formed by adding additional information obtained by an HDMI sink device to the information related to uncompressed image/audio data transmitted from an HDMI source device to the HDMI sink device. This data structure 1200 is to be transmitted to the mobile terminal 14. An IP packet is used as the transmission packet from the HDMI sink device to the mobile terminal 14. Further, the content information shown in FIG. 12 is inserted into the payload portion of the IP packet shown in FIG. 10.

Identification information (id) representing the packet of the content information is set in the first byte. The total number of pieces of the content information to be transmitted minus 1 (number_Content_minus 1) is set in the next byte. The loop is repeated the same number of times as number_Content_minus 1, so that the content information is stored into each loop. The content information is formed with at least one of the following pieces of information: a data length (length); content play duration information (Duration); the obtained CEC address of the HDMI source device (CEC_address); the number allotted to the HDMI terminal connected to the HDMI sink device (HDMI_terminal_number); and a title (Title) to which the extension (.hdmi) indicating the content is HDMI content (or at least one of the extension and the sequential number indicating the HDMI content) is added. This content information forms one data block. Note that the information related to the uncompressed image/audio data may include some other information, such as thumbnails of the content.

In a case where a content list is to be displayed with the browser of the mobile terminal 14, the content information obtained from the television receiver 13 is written in hyper text markup language (HTML), and a <video> tag extended by HTML5 is used. An example description of HTML tags is shown below. The CEC address and the information about the HDMI terminal number are added in the <source> tag indicating the content, to facilitate content selection in the television receiver 13.

<video>

<source src="title.hdmi" cec="0x02" port="1">

</video>                              [Mathematical Formula 1]

[Example of a Process in an HDMI Source Device at a Time of Connection]

Figure 13:
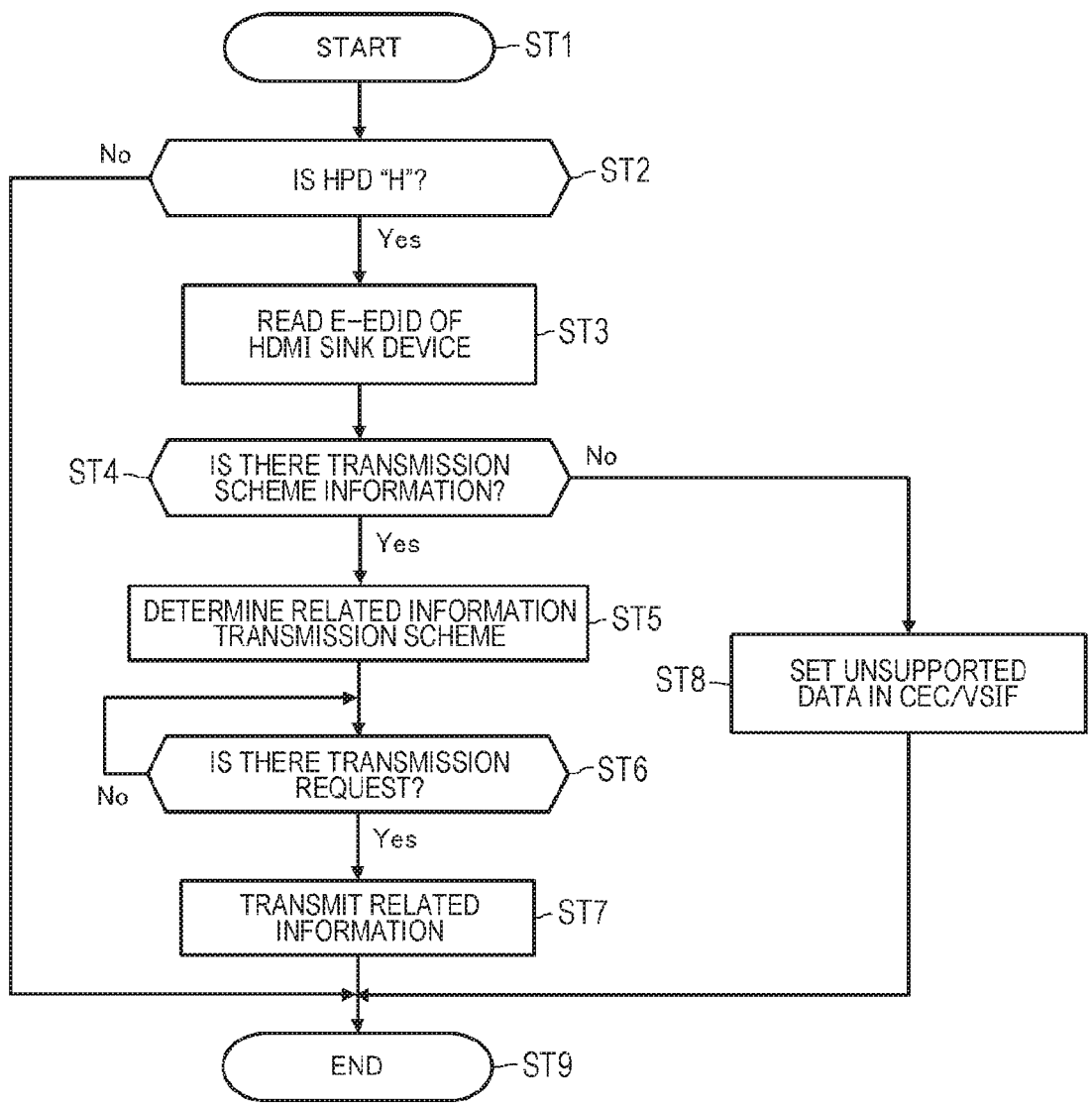
FIG. 13 is a flowchart showing the processing procedures to be carried out by an HDMI source device at a time of device connection.

Referring now to the flowchart shown in FIG. 13, a process to be performed by the BD recorder (an HDMI source device) 11 when connected to the television receiver (an HDMI sink device) 13 in the AV system 10 shown in FIG. 1 is described.

In step ST1, the BD recorder 11 starts the process, and then moves on to the procedure in step ST2. In step ST2, the BD recorder 11 determines whether the HPD signal is at the high level "H". If the HPD signal is not at the high level "H" (No in step ST2), it is determined that the BD recorder 11 is not connected to the television receiver (the sink device) 13. In this case, the BD recorder 11 promptly moves on to step ST9, and ends this process routine.

If the HPD signal is at the high level "H" (Yes in step ST2), on the other hand, the BD recorder 11 in step ST3 reads E-EDID from the EDID ROM in the HDMI reception unit 13b of the television receiver 13. Then, in step ST4, the BD recorder 11 determines whether the E-EDID contains transmission scheme information about the information related to uncompressed image/audio data.

If the E-EDID does not contain any transmission scheme information (No in step ST4), the BD recorder 11 in step ST8 sets data indicating non-transmission in a VSIF packet or a CEC. The BD recorder 11 then moves on to step ST9, and ends this process routine. Here, setting the data indicating non-transmission of the information related to the uncompressed image/audio data means setting the first bit and the 0th bit in the fourth byte of the VSIF packet (see FIG. 9) at the low level "L". This also means setting the Operand byte of the response command "0xCB" in the CEC packet (see FIG. 11) at the low level "L".

Further, if the E-EDID contains transmission scheme information (Yes in step ST4), the BD recorder 11 in step ST5 determines the transmission scheme for the information related to the uncompressed image/audio data. Then, in step ST6, the BD recorder 11 determines whether a request for transmission of the information related to uncompressed image/audio data has been issued from the HDMI sink device. If any transmission request has not been issued from the HDMI sink device (No in step ST6), the BD recorder 11 returns to step ST6.

If a transmission request has been issued from the HDMI sink device (Yes in step ST6), the BD recorder 11 in step ST7 transmits the information related to the uncompressed image/audio data to the requester HDMI sink device with a CEC packet, a VSIF packet, or an IP packet in accordance with the transmission scheme information received in step ST4. After that, the BD recorder 11 moves on to step ST9, and ends this process routine.

[Example of a Process of Determining a Related Information Transmission Scheme in an HDMI Source Device]

Figure 14:
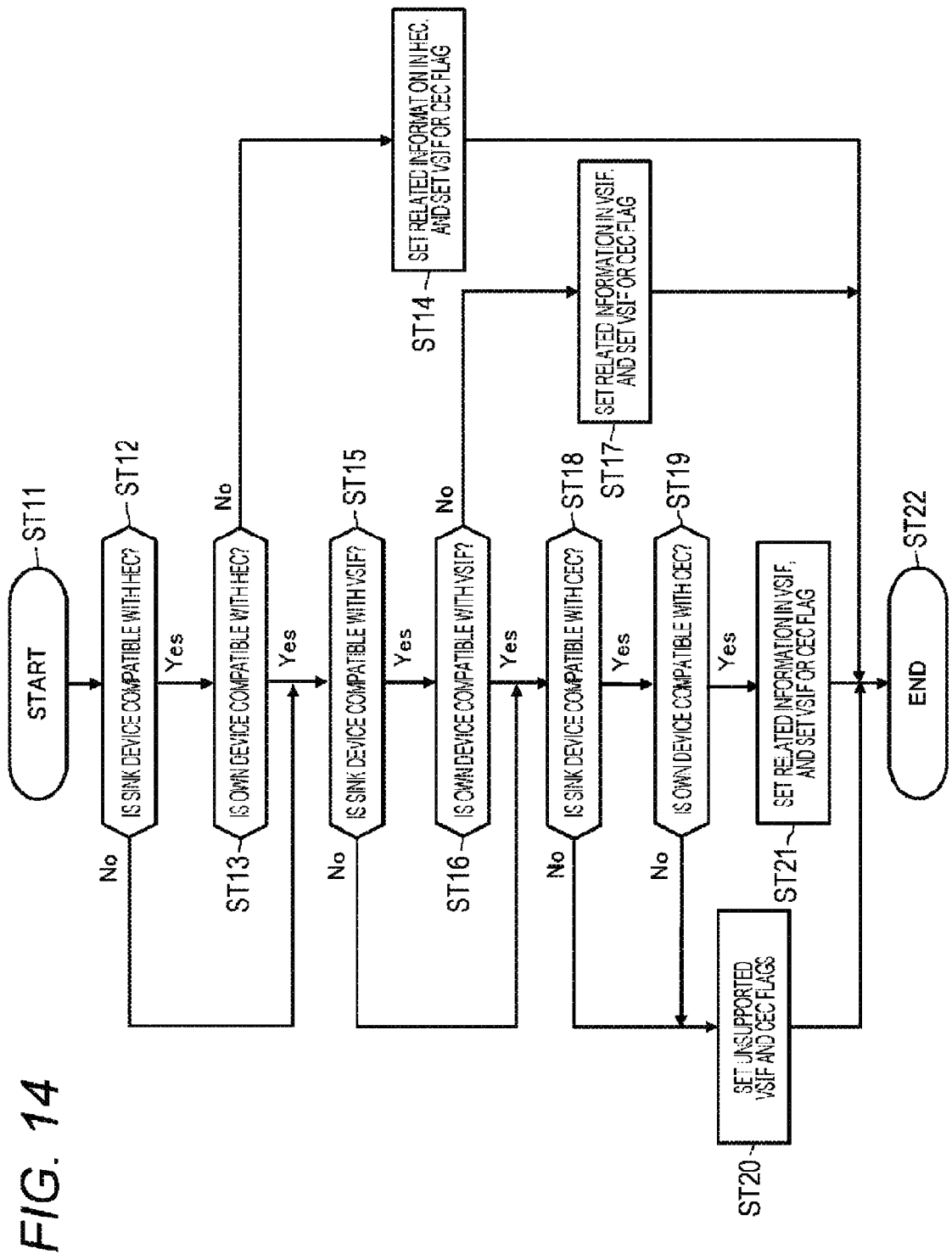
FIG. 14 is a flowchart showing the processing procedures for determining a transmission scheme for the related information in the HDMI source device.

Referring now to the flowchart shown in FIG. 14, a process of determining a related information transmission scheme (the procedure in step ST5 in FIG. 13) in the BD recorder (an HDMI source device) 11 in the AV system 10 shown in FIG. 1 is described. The process of determining a related information transmission scheme is performed mainly by the CPU 101, for example.

In step ST11, the BD recorder 11 starts the process, and then moves on to the procedure in step ST12. In step ST12, the BD recorder 11 determines whether the fifth bit in the 14th byte in the VSDB area of the television receiver (the HDMI sink device) 13 is at the high level "H", or determines whether the HDMI sink device is capable of receiving the information related to uncompressed image/audio data through a bidirectional high-speed bus interface (HEC line) (see FIG. 8). If the fifth bit in the 14th byte is not at the high level "H" (No in step ST12), the BD recorder 11 moves on to step ST15.

If the fifth bit in the 14th byte is at the high level "H" (Yes in step ST12), the BD recorder 11 moves on to the procedure in step ST13. In step ST13, the BD recorder 11 determines whether the BD recorder 11 is compatible with a bidirectional high-speed bus interface. If the BD recorder 11 is not compatible with a bidirectional high-speed bus interface (No in step ST13), the BD recorder 11 moves on to the next step ST15.

If the BD recorder 11 is compatible with a bidirectional high-speed bus interface (Yes in step ST13), the BD recorder 11 moves on to the next step ST14. In step ST14, the BD recorder 11 sets the information related to the uncompressed image/audio data to be transmitted in a predetermined IP packet of the bidirectional high-speed bus interface, and sets a predetermined bit in a VSIF packet or a CEC packet at the high level "H". The BD recorder 11 then moves on to the next step ST22, and ends the process.

Further, in step ST15, the BD recorder 11 determines whether the sixth bit in the 14th byte in the VSDB area of the television receiver (the sink device) 13 is at the high level "H", or determines whether the HDMI sink device is capable of receiving the information related to the uncompressed image/audio data through a VSIF. If the sixth bit in the 14th byte is not at the high level "H" (No in step ST15), the BD recorder 11 moves on to step ST18.

If the sixth bit in the 14th byte is at the high level "H" in step ST15, the BD recorder 11 moves on to the procedure in step ST16. In step ST16, the BD recorder 11 determines whether the BD recorder 11 is compatible with transmission of the information related to uncompressed image/audio data with a VSIF packet. If the BD recorder 11 is not compatible with transmission with a VSIF packet (No in step ST16), the BD recorder 11 moves on to the next step ST18.

If the BD recorder 11 is compatible with transmission with a VSIF packet, the BD recorder 11 moves on to the next step ST17. In step ST17, the BD recorder 11 sets the information related to the uncompressed image/audio data to be transmitted in a predetermined byte in the VSIF packet, and sets a predetermined bit in the VSIF packet or the CEC packet at the high level "H". The BD recorder 11 then moves on to the next step ST22, and ends the process.

In step ST18, the BD recorder 11 determines whether the seventh bit in the 14th byte in the VSDB area of the television receiver (the sink device) 13 is at the high level "H", or determines whether the HDMI sink device is capable of receiving the information related to the uncompressed image/audio data with a CEC packet. If the seventh bit in the 14th byte is not at the high level "H" (No in step ST18), the BD recorder 11 moves on to the next step ST20.

If the seventh bit in the 14th byte is at the high level "H" in step ST18, the BD recorder 11 moves on to the procedure in step ST19. In step ST19, the BD recorder 11 determines whether the BD recorder 11 is compatible with transmission of the information related to the uncompressed image/audio data with a CEC packet. If the BD recorder 11 is not compatible with transmission with a CEC packet (No in step ST19), the BD recorder 11 moves on to the next step ST20.

If the BD recorder 11 is compatible with transmission with a CEC packet (Yes in step ST19), the BD recorder 11 moves on to the next step ST21. In step ST21, the BD recorder 11 sets the information related to the uncompressed video/audio data to be transmitted in a predetermined byte in the CEC packet, and sets a predetermined bit in the CEC packet at the high level "H". The BD recorder 11 then moves on to step ST22, and ends this process routine.

Further, in step ST20, the BD recorder 11 determines that the BD recorder 11 is not compatible with any transmission scheme, and sets predetermined bits in the VSIF packet and the CEC packet at the low level "L". The BD recorder 11 then moves on to step ST22, and ends this process routine.

[Example of a Process in an HDMI Sink Device]

Figure 15:
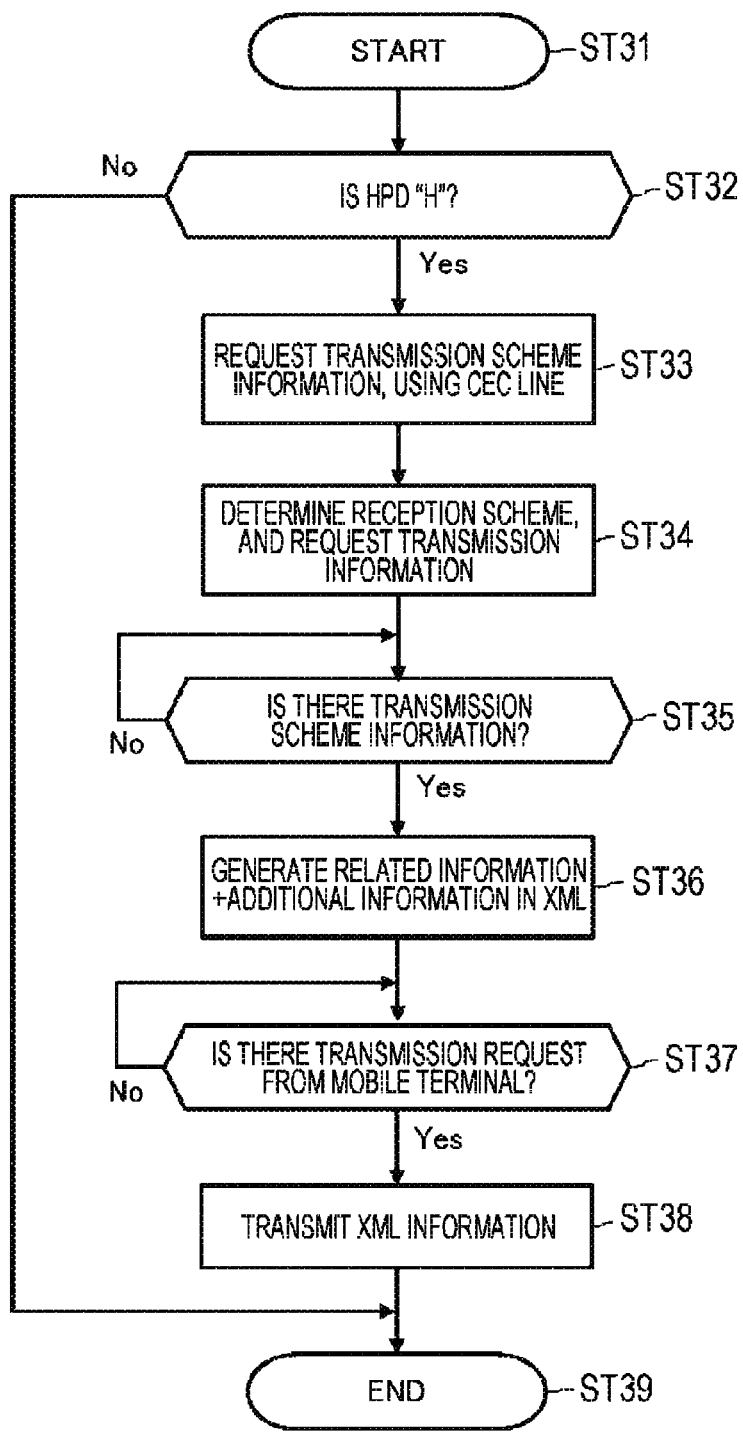
FIG. 15 is a flowchart showing the procedures for processing the information related to uncompressed image/audio data in an HDMI sink device.

Referring now to the flowchart shown in FIG. 15, a process to be performed on the information related to uncompressed image/audio data in the television receiver (an HDMI sink device) 13 in the AV system 10 shown in FIG. 1 is described.

In step ST31, the television receiver 13 starts the process, and then moves on to the procedure in step S32. In step ST32, the television receiver 13 determines whether the HPD 35 is at the high level "1".

If the HPD 35 is at the low level "0" (No in step ST32), the television receiver 13 determines that the BD recorder (an HDMI source device) 11 is not connected thereto. The television receiver 13 then moves on to step ST39, and ends this process routine. If the HPD 35 is at the high level "1" (Yes in step ST32), the television receiver 13 determines that the BD recorder (the HDMI source device) 11 is connected thereto. The television receiver 13 then moves on to the procedure in the next step ST33.

In step ST33, the television receiver 13 reads the determined transmission scheme information about the information related to the uncompressed image/audio data for the BD recorder (the HDMI source device) 11, using the CEC line 34 (or by transmitting a transmission scheme information request command through the CEC line 34). After that, the television receiver 13 moves on to the procedure in step ST34. In step ST34, the television receiver 13 transmits a request for transmission of the information related to the uncompressed image/audio data, using the selected transmission path in accordance with the read transmission scheme information. The television receiver 13 then moves on to the procedure in the next step ST35.

In step ST35, the television receiver 13 determines whether the information related to the uncompressed image/audio data from the BD recorder (the HDMI source device) 11 has been successfully received. If the related information has not been successfully received (No in step ST35), the procedure in step ST35 is repeated.

If the information related to the uncompressed image/audio data from the BD recorder (the HDMI source device) 11 has been successfully received (Yes in step ST35), the television receiver 13 moves on to the procedure in the next step ST36. In step ST36, the television receiver 13 adds self-obtained additional information to the received related information, to generate content information. The television receiver 13 then moves on to the procedure in the next step ST37. The television receiver 13 generates content information in extensible markup language (XML), for example.

In step ST37, the television receiver 13 determines whether a content information transmission request from the mobile terminal 14 has been received. If a content information transmission request has not been successfully received (No in step ST37), the procedure in step ST37 is repeated.

If a content information transmission request from the mobile terminal 14 has been successfully received (Yes in step ST37), the television receiver 13 moves on to the procedure in the next step ST38. In step ST38, the television receiver 13 transmits the content information (in XML) generated in step ST36 to the mobile terminal 14. The television receiver 13 then moves on to step ST39, and ends this process routine.

[Example of a Content Operation Process in an HDMI Sink Device]

Figure 16:
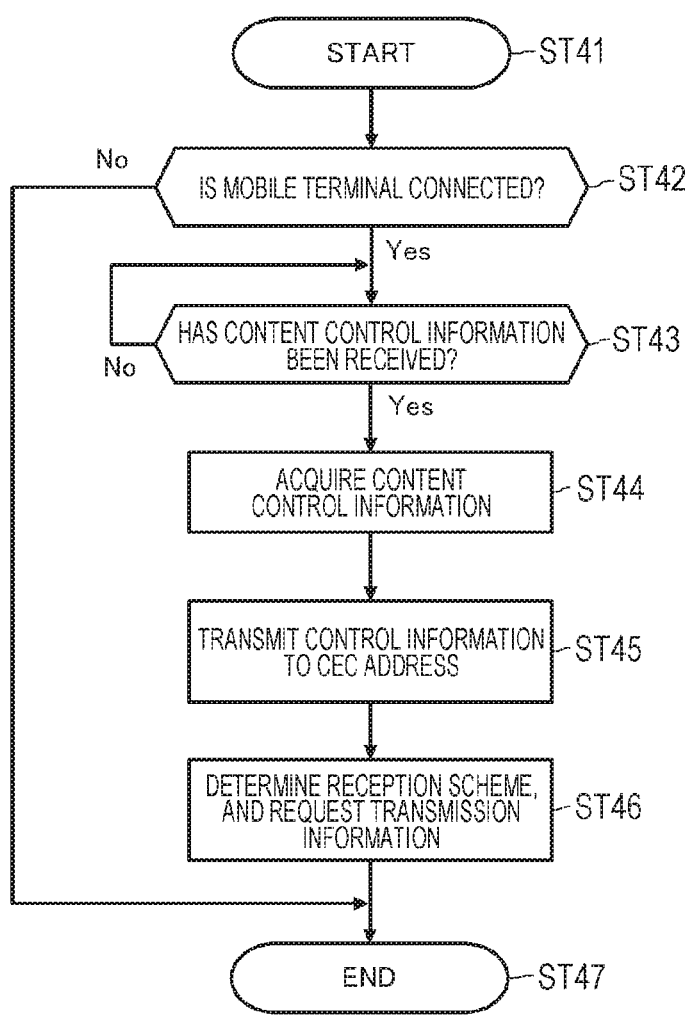
FIG. 16 is a flowchart showing the processing procedures to be carried out in the television receiver (the sink device) 13 when a content operation is performed from the mobile terminal 14.

Referring now to the flowchart shown in FIG. 16, a process to be performed in the television receiver (a sink device) 13 when a content operation is conducted from the mobile terminal 14 in the AV system 10 shown in FIG. 1 is described.

In step ST41, the television receiver 13 starts the process, and then moves on to the procedure in step ST42. In step ST42, the television receiver 13 determines whether the mobile terminal 14 is connected thereto by the wireless transmission path 16. If the mobile terminal 14 is not connected thereto (No in step ST42), the television receiver 13 determines that there is no content control from the mobile terminal 14. The television receiver 13 then moves on to step ST47, and ends this process routine.

If the mobile terminal 14 is connected thereto by the wireless transmission path 16 in step ST42, the television receiver 13 moves on to the next step ST43. In step ST43, the television receiver 13 determines whether content control information from the mobile terminal 14 has been received. If the content control information has not been received (No in step ST43), the television receiver 13 moves on to step ST43, and repeats the procedure.

If the content control information has been received in step ST43, the television receiver 13 moves on to the next step ST44. In step ST44, the television receiver 13 obtains the content control information from the mobile terminal 14, and then moves on to the next step ST45. The content control information is written in the XML format, for example.

In step ST45, the television receiver 13 extracts the CEC address from the content control information from the mobile terminal 14, sets the CEC address in the header of a CEC command, transmits a content control command to the CEC lines 34 of the HDMI terminals 13a and 13d, and then moves on to the next step ST46.

In step ST46, the television receiver 13 extracts the HDMI terminal number information from the content control information from the mobile terminal 14, and switches its input to an HDMI input terminal in accordance with the terminal number. After that, the television receiver 13 moves on to step ST47, and ends the process.

[Example of a Process in a Mobile Terminal]

Referring now to the flowchart shown in FIG. 17, a process to be performed on content-related information in the mobile terminal 14 in the AV system 10 shown in FIG. 1 is described. The mobile terminal 14 operates as a DMC in a 3-Box System of DLNA, for example.

In step ST50, the mobile terminal 14 starts the process, and then moves on to the procedure in step ST51. In step ST51, the mobile terminal 14 determines whether the main power supply thereto is on. If the main power supply is off (No in step ST51), the mobile terminal 14 determines that there is no content control from the mobile terminal 14. The mobile terminal 14 then moves on to step ST57, and ends the process.

If the main power supply to the mobile terminal 14 is on in step S51, the mobile terminal 14 moves on to the next step ST52. In step ST52, the mobile terminal 14 obtains content information from a DLN device connected to a DLNA network, using a CDS of DLNA. The mobile terminal 14 then moves on to the next step ST53.

In step ST53, the mobile terminal 14 determines whether an instruction to display a list of content information has been issued through a user operation. If there are no such instructions, the mobile terminal 14 returns to step ST53, and awaits a user instruction. If there is a user instruction, the mobile terminal 14 moves on to the next step ST54.

In step ST54, the mobile terminal 14 displays a list of content information on the display panel 310 thereof, and then moves on to the next step ST55.

In step ST55, the mobile terminal 14 determines whether specific content has been selected from the list of content information through a user operation. If any content has not been selected, the mobile terminal 14 returns to step ST55, and awaits selection by the user. If a selection has been made by the user, the mobile terminal 14 moves on to step ST56.

In step ST56, the mobile terminal 14 transmits the content control information related to the selected content to a DLNA server (the television receiver 13 in the example shown in FIG. 1) that holds the selected content. After that, the mobile terminal 14 moves on to step ST57, and ends the process.

As described above, the content control information is written in the XML format, and contains the CEC address and the HDMI terminal number information. Thus, the television receiver 13 can extract the CEC address from the content control information from the mobile terminal 14, set the CEC address in the header of a CEC command, and transmit a content control command to the CEC lines 34 of the HDMI terminals 13a and 13d. Further, the television receiver 13 can extract the HDMI terminal number information from the content control information, switch its input to an HDMI input terminal in accordance with the terminal number, and display desired uncompressed image/audio data received from the corresponding HDMI source device.

As described so far, according to the technology disclosed in this specification, a preferred selection of uncompressed image/audio data can be made among the three devices of an HDMI source device, an HDMI sink device, and a mobile terminal. In the AV system 10 shown in FIG. 1, the information related to uncompressed image/audio data is transmitted from the BD recorder 11 to the television receiver 13 via the HDMI cable 15-1. In response to this, the television receiver 13 generates information to which self-obtained additional information is added, and transmits the information to the mobile terminal 14, so that content control between the HDMI devices connected by the HDMI cable 15-1 can be appropriately conducted from the mobile terminal 14 as an M-DMC of DLNA.

<Modifications>

In the above described embodiment, the BD recorder 11 transmits the information related to uncompressed image/audio data and the transmission scheme information to the television receiver 13 by inserting the information into a blanking period of image data (image signals), using a VSIF packet.

Further, the BD recorder 11 may transmit the information related to uncompressed image/audio data and the transmission scheme information to the television receiver 13 via the CEC line 34 that is a control data line of the HDMI cable 15-1. Alternatively, the BD recorder 11 may transmit the information related to uncompressed image/audio data and the transmission scheme information to the television receiver 13 via a bidirectional high-speed bus interface (HEC) formed with the reserve line 37 and the HPD line 35 of the HDMI cable 15-1.

Further, in the above described embodiment, the E-EDID in the television receiver 13 contains the transmission scheme information about the information related to uncompressed image/audio data with which the television receiver 13 is compatible. The BD recorder 11 reads the E-EDID via the DDC 33 of the HDMI cable 15-1, to obtain the transmission scheme information about the information related to the uncompressed video/audio data with which the television receiver 13 is compatible.

Alternatively, the BD recorder 11 may receive the transmission scheme information about the information related to the uncompressed image/audio data with which the television receiver 13 is compatible, from the television receiver 13 via the CEC line 34 that is a control data line of the HDMI cable 15-1, or via a bidirectional high-speed bus interface (HEC) formed with the reserve line 37 and the HPD line 35 of the HDMI cable 15-1.

Further, in the above described embodiment, the BD recorder 11 transmits both the information related to uncompressed image/audio data and the transmission scheme information to the television receiver 13, for example. However, only either the information related to uncompressed image/audio data or the transmission scheme information may be transmitted.

INDUSTRIAL APPLICABILITY

The technology disclosed in this specification has been described in detail, with reference to specific embodiments. However, it is obvious that those skilled in the art can make modifications to and substitutions of the embodiments without departing from the scope of the technology disclosed in this specification.

In this specification, the embodiment in which the technology disclosed in this specification is applied to an AV system using HDMI transmission paths has been mainly described. However, examples of baseband digital interfaces other than HDMI include a mobile high-definition link (MHL), a digital visual interface (DVI) interface, a display port (DP) interface, and a wireless interface using 60-GHz millimeter waves. The technology disclosed in this specification can also be applied in cases where the information related to uncompressed image/audio data and the transmission scheme information are transmitted through these digital interfaces.

Further, the embodiment in which the technology disclosed in this specification is applied to an AV system that uses the BD recorder 11 as a transmission device (a source device) and the television receiver 13 as a reception device (a sink device) has been mainly described so far. However, the technology disclosed in this specification can of course be applied to any system that uses some other transmission device and some other reception device.

In short, the technology disclosed in this specification has been described through examples, and the descriptions in this specification should not be interpreted in a restrictive manner. The claims should be taken into account in understanding the subject matter of the technology disclosed in this specification.

Note that the technology disclosed in this specification may also be embodied in the configurations described below.

(1) A communication device including:
  a data transmission unit that transmits uncompressed image/audio data to an external device via a predetermined transmission path; and
  an information transmission unit that transmits information related to the uncompressed image/audio data to be transmitted by the data transmission unit, and transmission scheme information to the external device via the transmission path.

(1-1) The communication device of (1), wherein the data transmission unit transmits the uncompressed image/audio data to the external device via the transmission path with a differential signal.

(1-2) The communication device of (1), wherein the transmission path is formed with a pair of differential transmission paths, at least one differential transmission path of the pair of differential transmission paths having a function to report a connection status of the external device.

(2) The communication device of (1), further including:
  an information reception unit that receives transmission scheme information about information related to uncompressed image/audio data with which the external device is compatible, from the external device via the transmission path; and
  a scheme selection unit that selects a transmission scheme to be used in the information transmission unit, in accordance with the transmission scheme information received by the information reception unit, wherein the information transmission unit transmits the information related to the uncompressed image/audio data to the external device via the transmission path, in accordance with the scheme selected by the scheme selection unit.

(2-1) The communication device of (2), wherein the scheme selection unit selects the transmission scheme to be used in the information transmission unit from among transmission schemes with which the external device and the communication device are compatible.

(3) The communication device of (1) or (2), wherein the information transmission unit transmits the information related to the uncompressed image/audio data and the transmission scheme information to the external device by inserting the related information and the transmission scheme information into a blanking period of the uncompressed image/audio data to be transmitted by the data transmission unit.

(4) The communication device of (1) or (2), wherein the information transmission unit transmits the information related to the uncompressed image/audio data and the transmission scheme information to the external device via a bidirectional communication path formed with a predetermined line included in the transmission path.

(5) The communication device of (1) or (2), wherein the information transmission unit transmits the information related to the uncompressed image/audio data and the transmission scheme information to the external device via a control data line included in the transmission path.

(6) The communication device of any of (1) through (5), wherein the information transmission unit transmits at least one piece of information as the information related to the uncompressed image/audio data, the at least one piece of information being among length information, play duration information, title information about the uncompressed image/audio data, and a thumbnail of content.

(7) A communication method including:
a data transmission step of transmitting uncompressed image/audio data to an external device via a predetermined transmission path; and
an information transmission step of transmitting information related to the uncompressed image/audio data to be transmitted by the data transmission unit, and transmission scheme information to the external device via the transmission path.

(8) A computer program written in a computer-readable format to cause a computer to function as:
a data transmission unit that transmits uncompressed image/audio data to an external device via a predetermined transmission path; and
an information transmission unit that transmits information related to the uncompressed image/audio data to be transmitted by the data transmission unit, and transmission scheme information to the external device via the transmission path.

(9) A communication device including:
a data reception unit that receives uncompressed image/audio data from an external device via a predetermined transmission path;
an information reception unit that receives information related to the uncompressed image/audio data to be received by the data reception unit, and transmission scheme information from the external device via the transmission path; and a data processing unit that processes the information related to the uncompressed image/audio data received by the information reception unit, in accordance with the transmission scheme information received by the information reception unit.

(9-1) The communication device of (9), wherein the data reception unit transmits the uncompressed image/audio data to the external device via the transmission path with a differential signal.

(9-2) The communication device of (9), wherein the transmission path is formed with a pair of differential transmission paths, at least one differential transmission path of the pair of differential transmission paths having a function to report a connection status of the external device.

(10) The communication device of (9), further including:
an information storage unit that stores transmission scheme information about information related to uncompressed image/audio data with which the communication device is compatible; and an information transmission unit that transmits the transmission scheme information stored in the information storage unit to the external device via the transmission path.

(10-1) The communication device of (10), wherein the information storage unit stores a flag of each transmission scheme, the flag indicating whether the communication device is compatible with the corresponding transmission scheme.

(11) The communication device of (9) or (10), wherein the information reception unit extracts the information related to the uncompressed image/audio data and the transmission scheme information from a blanking period of the uncompressed image/audio data to be received by the data reception unit.

(12) The communication device of (9) or (10), wherein the information reception unit receives the information related to the uncompressed image/audio data and the transmission scheme information from the external device via a bidirectional communication path formed with a predetermined line included in the transmission path.

(13) The communication device of (9) or (10), wherein the information reception unit receives the information related to the uncompressed image/audio data and the transmission scheme information from the external device via a control data line included in the transmission path.

(14) The communication device of any of (9) through (13), wherein:
the data processing unit generates content information by adding additional information obtained by the communication device to the information related to the uncompressed image/audio data received by the information reception unit; and
the communication device further includes
a second information transmission unit that transmits the content information to a second external device via a second transmission path.

(15) The communication device of (14), wherein the data processing unit adds at least one piece of information as the additional information, the at least one piece of information being among a sequential number or an extension indicating the uncompressed image/audio data, address information (the CEC address) about the external device, and connection information about the external device (the number allotted to a terminal to which the external device is connected).

(16) The communication device of (14), further including:
a second information reception unit that receives control information about the uncompressed image/audio data from the second external device via the second transmission path; and
a connection control unit that controls the connection to the external device, in accordance with the control information received by the second information reception unit,
wherein the information transmission unit transmits the control information about the uncompressed image/audio data, via the transmission path, to the external device connected by the connection control unit.

(16-1) The communication device of (16), wherein the connection control unit selects the connection terminal corresponding to the address information (the CEC address) about the external device, the address informationbeing included in the received control information.

(17) A communication device including:
a data reception step of receiving uncompressed image/audio data from an external device via a predetermined transmission path;
an information reception step of receiving information related to the uncompressed image/audio data to be received in the data reception step, and transmission scheme information from the external device via the transmission path; and
a data processing step of processing the information related to the uncompressed image/audio data received by the information reception unit, in accordance with the transmission scheme information received in the information reception step.

(17-1) The communication method of (17), wherein:
the data processing step includes generating content information by adding additional information obtained by the communication device to the information related to the uncompressed image/audio data received by the information reception unit; and
the communication method further includes:
a second information transmission step of transmitting the content information to a second external device via a second transmission path;
a second information reception step of receiving control information about the uncompressed image/audio data from the second external device via the second transmission path;
a connection control step of controlling the connection to the external device, in accordance with the control information received in the second information reception step; and
a step of transmitting the control information about the uncompressed image/audio data, via the transmission path, to the external device connected in the connection control step.

(18) A computer program written in a computer-readable format to cause a computer to function as:
a data reception unit that receives uncompressed image/audio data from an external device via a predetermined transmission path;
an information reception unit that receives information related to the uncompressed image/audio data to be received by the data reception unit, and transmission scheme information from the external device via the transmission path; and
a data processing unit that processes the information related to the uncompressed image/audio data received by the information reception unit, in accordance with the transmission scheme information received by the information reception unit.

(19) A communication device including:
an information reception unit that receives information related to uncompressed image/audio data from an external device via a second transmission path;
a data processing unit that displays and processes list information about the uncompressed image/audio data, in accordance with the information related to the uncompressed image/audio data received by the information reception unit; and
an information transmission unit that transmits information related to uncompressed image/audio data selected from the list information to the external device via the second transmission path.

(20) A computer program written in a computer-readable format to cause a computer to function as:
an information reception unit that receives information related to uncompressed image/audio data from an external device via a second transmission path;
a data processing unit that displays and processes list information about the uncompressed image/audio data, in accordance with the information related to the uncompressed image/audio data received by the information reception unit; and
an information transmission unit that transmits information related to uncompressed image/audio data selected from the list information to the external device via the second transmission path.

REFERENCE SIGNS LIST

10 AV system
11 BD recorder
11a HDMI terminal
11b HDMI transmission unit
11c High-speed bus I/F
12 Set Top Box (STB)
12a HDMI terminal
12b HDMI transmission unit
12c High-speed bus I/F
13 Television receiver
13a, 13d HDMI terminal
13b, 13e HDMI reception unit
13c, 13f High-speed bus I/F
13g Wireless transmission/reception unit
14 Mobile terminal
14a Wireless transmission/reception unit
15-1, 15-2 HDMI cable
16 Wireless transmission path
31 HDMI transmitter
32 TMDS receiver
101 CPU
102 Internal bus
103 Flash ROM
104 SDRAM
105 Remote control reception unit
106 Remote control transmitter
107 Recording medium control interface
108 BD drive
109 HDD
110 MPEG decoder
111 Graphics generator circuit
112 Image output terminal
113 Audio output terminal
114 Display control unit 115 Panel drive circuit
116 Display panel
117 Power supply unit
118 SSD
201 Antenna terminal
202 Digital tuner
203 MPEG decoder
204 Image signal processing circuit
205 Graphics generator circuit
206 Panel drive circuit
207 Display panel
208 Audio signal processing circuit
209 Audio amplifier circuit
210 Speaker
211 Internal bus
212 CPU
213 Flash ROM
214 SDRAM
215 Remote control reception unit
216 Remote control transmitter
218 Display control unit
219 Power supply unit
301 CPU
302 Internal bus
303 Flash ROM
304 SDRAM
305 Sound processing unit
306 Public network transmission/reception unit
307 Display control unit
308 Graphics generator circuit
309 Panel drive circuit
310 Display panel
311 Input unit
312 Sound output microphone
313 Speaker
314 Power supply unit

The invention claimed is:

1. A communication device, comprising:
 circuitry configured to:
  transmit uncompressed image and audio data to an external device via a determined transmission path;
  select a transmission scheme for transmission of information related to the uncompressed image and audio data based on a transmission speed of the transmission scheme; and
  transmit the information related to the uncompressed image and audio data, and transmission scheme information to the external device based on the selected transmission scheme via the determined transmission path.

2. The communication device according to claim 1, wherein the circuitry is further configured to:
 receive the transmission scheme information about the information related to the uncompressed image and audio data with which the external device is compatible, from the external device via the determined transmission path;
 select the transmission scheme in accordance with the received transmission scheme information; and
 transmit the information related to the uncompressed image and audio data to the external device via the determined transmission path, in accordance with the selected transmission scheme.

3. The communication device according to claim 1, wherein the circuitry is further configured to transmit the information related to the uncompressed image and audio data and the transmission scheme information to the external device by insertion of the information and the transmission scheme information into a blanking period of the uncompressed image and audio data.

4. The communication device according to claim 1, wherein the circuitry is further configured to transmit the information related to the uncompressed image and audio data and the transmission scheme information to the external device via a bidirectional communication path with a determined line included in the determined transmission path.

5. The communication device according to claim 1, wherein the circuitry is further configured to transmit the information related to the uncompressed image and audio data and the transmission scheme information to the external device via a control data line included in the determined transmission path.

6. The communication device according to claim 1, wherein the circuitry is further configured to transmit at least one piece of information as the information related to the uncompressed image and audio data, and
 wherein the at least one piece of information is at least one of length information, play duration information, or title information about the uncompressed image and audio data, or a thumbnail of content.

7. A communication method, comprising:
 transmitting uncompressed image and audio data to an external device via a determined transmission path;
 selecting a transmission scheme for transmission of information related to the uncompressed image and audio data based on a transmission speed of the transmission scheme; and
 transmitting the information related to the uncompressed image and audio data and transmission scheme information to the external device based on the selected transmission scheme via the determined transmission path.

8. A non-transitory computer-readable medium, having stored thereon, computer-executable instructions, which when executed by a computer, cause the computer to execute operations, the operations comprising:
 transmitting uncompressed image and audio data to an external device via a determined transmission path;
 selecting a transmission scheme for transmission of information related to the uncompressed image and audio data based on a transmission speed of the transmission scheme; and
 transmitting the information related to the uncompressed image and audio data and transmission scheme information to the external device based on the selected transmission scheme via the determined transmission path.

9. A communication device, comprising:
 circuitry configured to:
  receive uncompressed image and audio data from a first external device via a first transmission path;
  receive information related to the uncompressed image and audio data, and transmission scheme information from the first external device based on a transmission scheme via the first transmission path, wherein the transmission scheme is selected based on a transmission speed of the transmission scheme; and
  process the information related to the uncompressed image and audio data received in accordance with the transmission scheme information.

10. The communication device according to claim 9, the circuitry is further configured to:

store the transmission scheme information about the information related to uncompressed image and audio data with which the communication device is compatible; and transmit the stored transmission scheme information to the first external device via the first transmission path.

11. The communication device according to claim 9, wherein the circuitry is further configured to extract the information related to the uncompressed image and audio data and the transmission scheme information from a blanking period of the uncompressed image and audio data.

12. The communication device according to claim 9, wherein the circuitry is further configured to receive the information related to the uncompressed image and audio data and the transmission scheme information from the first external device via a bidirectional communication path with a determined line included in the first transmission path.

13. The communication device according to claim 9, wherein the circuitry is further configured to receive the information related to the uncompressed image and audio data and the transmission scheme information from the first external device via a control data line included in the first transmission path.

14. The communication device according to claim 9, wherein the circuitry is further configured to:
generate content information by addition of additional information obtained by the communication device to the information related to the uncompressed image and audio data received; and
transmit the content information to a second external device via a second transmission path.

15. The communication device according to claim 14, wherein the circuitry is further configured to add at least one piece of information as the additional information,
wherein the at least one piece of information is at least one of a sequential number and an extension indicating the uncompressed image and audio data, address information about the first external device, or connection information about the first external device, wherein the connection information comprises a number allotted to a terminal to which the first external device is connected.

16. The communication device according to claim 14, the circuitry is further configured to:
receive control information about the uncompressed image and audio data from the second external device via the second transmission path;
control connection to the first external device in accordance with the control information; and
transmit the control information about the uncompressed image or audio data, via the first transmission path, to the first external device.

17. A communication method, comprising:
receiving uncompressed image and audio data from an external device via a determined transmission path;
receiving information related to the uncompressed image and audio data, and transmission scheme information from the external device based on a transmission scheme via the determined transmission path, wherein the transmission scheme is selected based on a transmission speed of the transmission scheme; and
processing the information related to the uncompressed image and audio data received in accordance with the transmission scheme information.

18. A non-transitory computer-readable medium having stored thereon, computer-executable instructions, which when executed by a computer, cause the computer to control a communication device to execute operations, the operations comprising:
receiving uncompressed image and audio data from an external device via a determined transmission path;
receiving information related to the uncompressed image and audio data, and transmission scheme information from the external device based on a transmission scheme via the determined transmission path, wherein the transmission scheme is selected based on a transmission speed of the transmission scheme; and
processing the information related to the uncompressed image and audio data received in accordance with the transmission scheme information.

19. A communication device, comprising:
circuitry configured to:
receive first information related to uncompressed image and audio data from an external device based on a transmission scheme via a transmission path, wherein the transmission scheme is selected based on a transmission speed of the transmission scheme;
display and process list information about the uncompressed image and audio data, in accordance with the first information related to the uncompressed image and audio data; and
transmit second information related to uncompressed image and audio data selected from the list information to the external device based on the transmission scheme via the transmission path.

20. A non-transitory computer-readable medium, having stored thereon, computer-executable instructions, which when executed by a computer, cause the computer to execute operations, the operations comprising:
receiving first information related to uncompressed image and audio data from an external device based on a transmission scheme via a transmission path, wherein the transmission scheme is selected based on a transmission speed of the transmission scheme;
displaying and processing list information about the uncompressed image and audio data, in accordance with the first information related to the uncompressed image and audio; and
transmitting second information related to uncompressed image and audio data selected from the list information to the external device based on the transmission scheme via the transmission path.

* * * * *